(12) United States Patent
Roy et al.

(10) Patent No.: US 11,537,390 B2
(45) Date of Patent: Dec. 27, 2022

(54) SMART PRODUCTS LIFECYCLE MANAGEMENT PLATFORM

(71) Applicants: Utpal Roy, Jamesville, NY (US); Yunpeng Li, Jamesville, NY (US)

(72) Inventors: Utpal Roy, Jamesville, NY (US); Yunpeng Li, Jamesville, NY (US)

(73) Assignee: Syracuse University, Syracuse, NY (US)

( * ) Notice: Subject to any disclaimer, the term of this patent is extended or adjusted under 35 U.S.C. 154(b) by 1042 days.

(21) Appl. No.: 16/227,812

(22) Filed: Dec. 20, 2018

(65) Prior Publication Data

US 2019/0213893 A1     Jul. 11, 2019

Related U.S. Application Data

(60) Provisional application No. 62/613,850, filed on Jan. 5, 2018.

(51) Int. Cl.
*G06F 8/65* (2018.01)
*G06F 8/70* (2018.01)
(Continued)

(52) U.S. Cl.
CPC ............... *G06F 8/70* (2013.01); *G06F 8/656* (2018.02); *G06F 8/658* (2018.02)

(58) Field of Classification Search
CPC ......... G08G 5/0069; G06F 16/00; G06F 8/70; G06F 8/656; G05D 1/0088; G06N 5/022;
(Continued)

(56) References Cited

U.S. PATENT DOCUMENTS

2018/0309592 A1* 10/2018 Stolfus ................. H04L 47/122
2019/0266688 A1*  8/2019 Denton ................. G06N 20/00

OTHER PUBLICATIONS

Min-Jung Yoo et al., Closed-Loop Lifecycle Management of Service and Product in the Internet of Things: Semantic Framework for Knowledge Integration, PMC, 2016, pp. 1-26. Retrieved from the Internet: <URL:https://www.ncbi.nlm.nih.gov/pmc/articles/PMC4970100/pdf/sensor>. (Year: 2016).*
(Continued)

*Primary Examiner* — Hanh Thi-Minh Bui
(74) *Attorney, Agent, or Firm* — David Nocilly

(57) ABSTRACT

A Smart Products Lifecycle Management (sPLM) system that is built upon the smart component data model and the NPD$^3$ process model, is enabling engineers, data scientists, and other stakeholders to collaborate on a common platform to develop smart products. The sPLM system is validated by applying it to unmanned aircraft systems (UAS) development and operations, referred to as UsPLM. The UsPLM has shared lifecycle management functions that are provided as web services and can be applied to all digital models of UAS devices, software, autonomy functions, and missions. The individual models can be versioned, tracked, and be composed with other compatible models, if needed. The rule and scoring engines embedded in the UsPLM allow building and executing configuration rules, regulation rules, and various machine-learning models. This facilitates modular UAS architecture design so that the UAS has the flexibility to be reconfigured for various mission applications.

18 Claims, 23 Drawing Sheets

(51) Int. Cl.
*G06F 8/656* (2018.01)
*G06F 8/658* (2018.01)

(58) Field of Classification Search
CPC .......... G06N 7/00; G06N 5/025; G06Q 10/20;
G06Q 50/30; G06Q 10/06; B64C 39/024;
B64C 2201/12; B64D 2045/0085
See application file for complete search history.

(56) References Cited

OTHER PUBLICATIONS

IEEE Transactions On Engineering Management, Towards Development of a Smart Product Data Model for Next Generation of PLM Systems, Yunpeng Li, Utpal Roy, Seung-Jun Shin, Y. Tina Lee and Sudarsan Rachuri, pp. 1-12, Publication Date Oct. 29, 2015.

\* cited by examiner

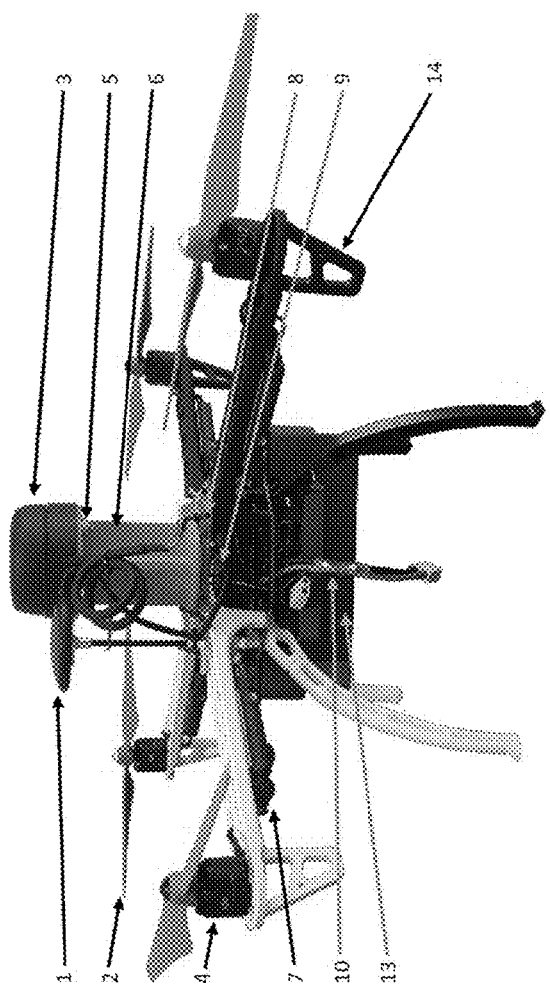

FIG. 14

| No. | Description | Quantity |
|---|---|---|
| 1 | GPS Module with stand | 1 |
| 2 | Propellers | 4 |
| 3 | Lidar | 1 |
| 4 | DJI Brushless Motors | 4 |
| 5 | Bolts | 4 |
| 6 | Support for Lidar | 1 |
| 7 | Electronic Speed Controller | 4 |
| 8 | Bolts | 16 |
| 9 | Pixhawk Flight Controller | 1 |
| 10 | Power Regulator | 1 |
| 11 | Radio Module | 2 |
| 12 | Buzzer | 1 |
| 13 | Subassembly Base-Box | 1 |
| 14 | DJI Frame Flame Wheel F450 | 1 |

| No. | Description | Quantity |
|---|---|---|
| 1 | Sensor Circuits | 3 |
| 2 | Raspberry Pi | 1 |
| 3 | Battery | 1 |
| 4 | Screws to fix Raspberry Pi | 3 |
| 5 | Bolts to fix the base-box on to the airframe | 1 |
| 6 | Lock Plate | 1 |

SMART PRODUCTS LIFECYCLE MANAGEMENT PLATFORM

CROSS-REFERENCE TO RELATED APPLICATIONS

The present application claims priority to U.S. Provisional App. No. 62/613,850, filed on Jan. 5, 2018.

BACKGROUND OF THE INVENTION

1. Field of the Invention

The present invention relates to smart products lifecycle management (sPLM) systems and, more particularly, to a product lifecycle management system that can be used with smart products such as unmanned aircraft systems.

2. Description of the Related Art

New information and communication technologies—such as sensor networks, predictive analytics, and cloud computing—are enabling a fast growth of connected "smart products." Embedded computing and networking functionalities into products are now common features. They provide several fundamental capabilities to smart products. A smart product (1) possesses a globally unique identification; (2) is able to retain or store data about itself; (3) is able to continuously monitor its status and environment; (4) could react and adapt to environmental and operational conditions; (5) is able to maintain optimal performance; and, (6) could actively communicate with the user, environment, and/or other products and systems.

These capabilities provide smart products with a certain degree of intelligence that enables them to perform reasoning based on known knowledge, and to learn new knowledge from past/present experience. The degree of intelligence of smart products depends on how well they handle information, identify and solve problems, and make good decisions. The increasing use of sensors within smart products provides the data needed for intelligence. Data analytics provides the tools and technologies needed to increase the degree of intelligence.

Based on statistical and machine-learning techniques, data analytics helps a product not only to understand what has happened (descriptive analytics) and why it happened (diagnostic analytics), but also to determine what could happen (predictive analytics) and what should it do (prescriptive analytics). The predictive analytics is the key technology to use past and current behaviors to improve decisions for future actions. This technology can be implemented inside the physical product itself or completely outside the physical product using a cloud-based service. Either way, an up-to-date analytics model is a necessary foundation for such a technology.

Creating smart products requires developing physical products and analytics models in a transdisciplinary way across mechatronics, software, and service domains. A lifecycle approach is necessary to capture data and information required by all stakeholders, as well as to exchange that data/information among heterogeneous processes, tools, and information systems. Conventional product lifecycle management (PLM) provides a shared platform for creating, managing, and disseminating product-related information across the extended enterprise. It also provides capabilities to access, use, and maintain product definition information, as well as the business processes related to all lifecycle activities as they may be required by any stakeholder. Conventional PLM, however, focuses on physical product related information management and is not designed for smart products that intensively involve data analytics. Accordingly, there is a need in the art for a system that can be used to record, manage, and track multidisciplinary data generated throughout a smart product's lifecycle stages.

BRIEF SUMMARY OF THE INVENTION

The present invention provides a product lifecycle management system that can be used with smart products such as unmanned aircraft systems. The platform of the present invention includes "smart component" data models that incorporate analytics models as "parts" or "services" of products in their master records in the product lifecycle management system. These smart-component data models can be modularized, composed, reused, traced, maintained, and replaced on demand just like their physical counterparts. As an example, the platform was implemented as a prototype system that demonstrated the feasibility of the proposed data models in connection with an unmanned aircraft system.

More particularly, the present invention includes a system for managing a smart product. The system includes a product application installed on the smart product and including a set of data describing a plurality of physical components of the smart product and a set of analytic models governing operation of the product, wherein at least one of analytical models in the set of analytic models will be modified by the product application in response to use of the smart product. The system also includes a product lifecycle management system positioned remotely from and in communication with the product application, wherein the product lifecycle management system is programmed to include a rule engine for modeling operation of the smart product and a scoring engine for assessing operation of the smart product based on modeling by the rule engine. The system further includes a repository in communication with the product application and the product lifecycle management system for storing the set of data and the set of analytical models so that the set of analytical models includes any modifications to the at least one of the analytical models made by the product application in response to use of the smart product. The smart product may comprise an unmanned aerial vehicle. The set of data describing the plurality of physical components may comprise a type of vehicle, a type of airframe, a type of avionics, a payload, and a power system. The plurality of analytical components may comprise an autonomous navigation system having at least one navigation model that can be adjusted over time to change how the unmanned aerial vehicle controls its movement. The navigation model may include at least one of state estimation, perception, and situation awareness. The plurality of analytical components may include an autonomous guidance system having at least one guidance model that can be adjusted over time to change how the unmanned aerial vehicle selects a path of travel. The plurality of analytical components may include an autonomous control system having at least one control model that can be adjusted over time to change how the unmanned aerial vehicle controls its flight. The control model may include at least one of linear control, non-linear control, and learning-based control. The plurality of analytical components may include a mission plan for a specific task.

The present invention also includes a method for managing a smart product. The first step of the method involves providing a product application installed on the smart product and including a set of data describing a plurality of physical components of the smart product and a set of analytic models governing operation of the product, wherein at least one of analytical models in the set of analytic models will be modified by the product application in response to use of the smart product, a product lifecycle management system positioned remotely from and in communication with the product application, wherein the product lifecycle management system is programmed to include a rule engine for modeling operation of the smart product and a scoring engine for assessing operation of the smart product based on modeling by the rule engine, and a repository in communication with the product application and the product lifecycle management system for storing the set of data and the set of analytical models so that the set of analytical models includes any modifications to the at least one of the analytical models made by the product application in response to use of the smart product. The second step of the method involves updating the product lifecycle management system and the repository with any changes to the set of analytic models governing operation of the product.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 10:
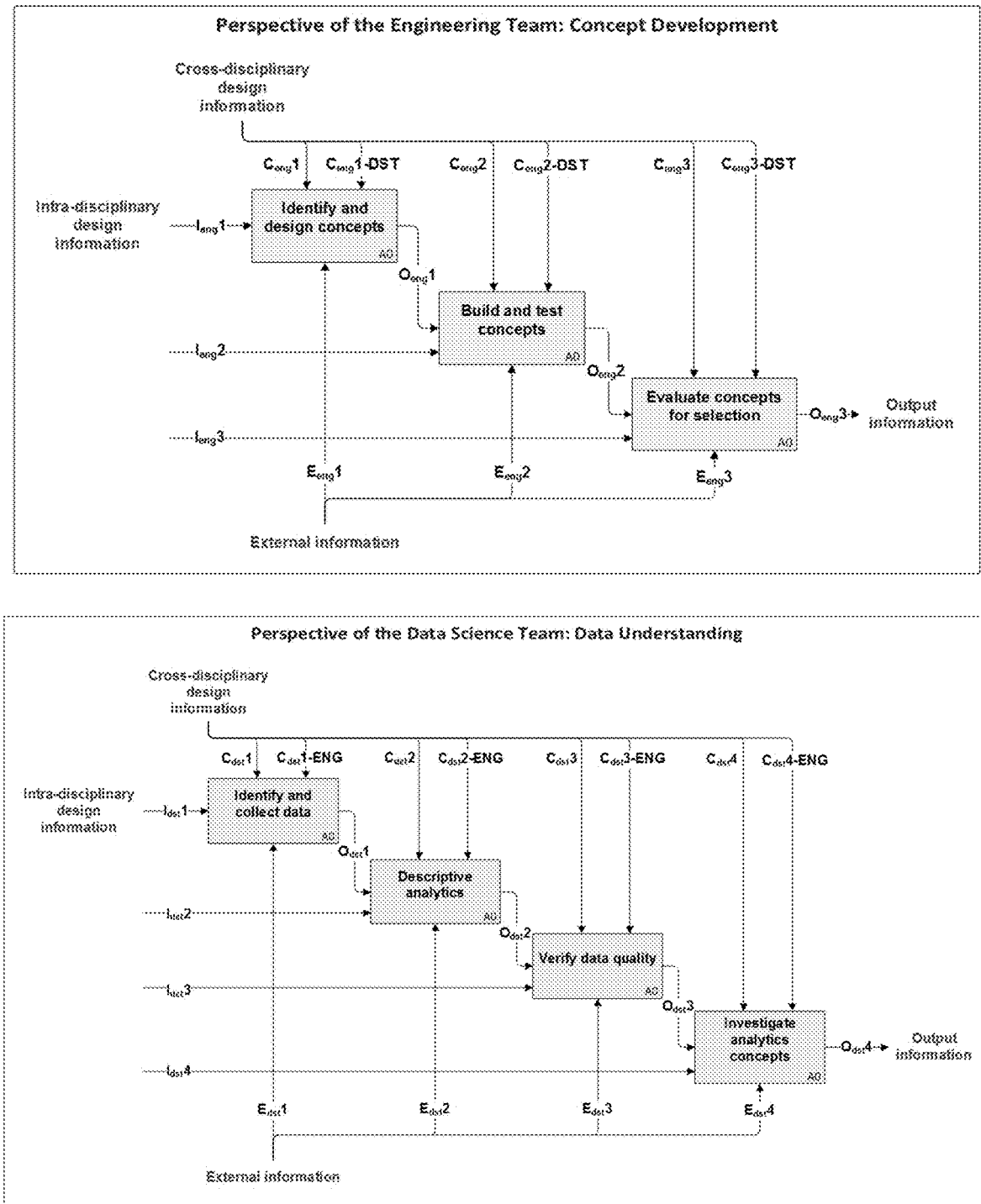
Figure 11:
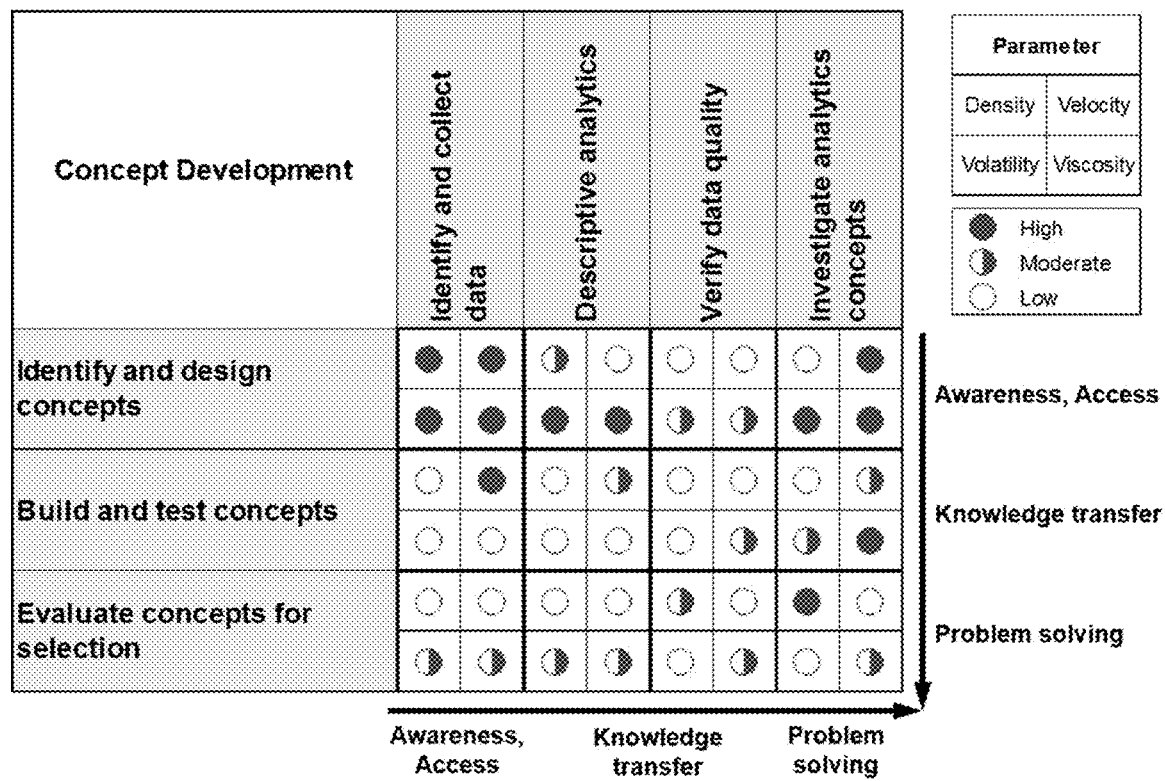
Figure 12:
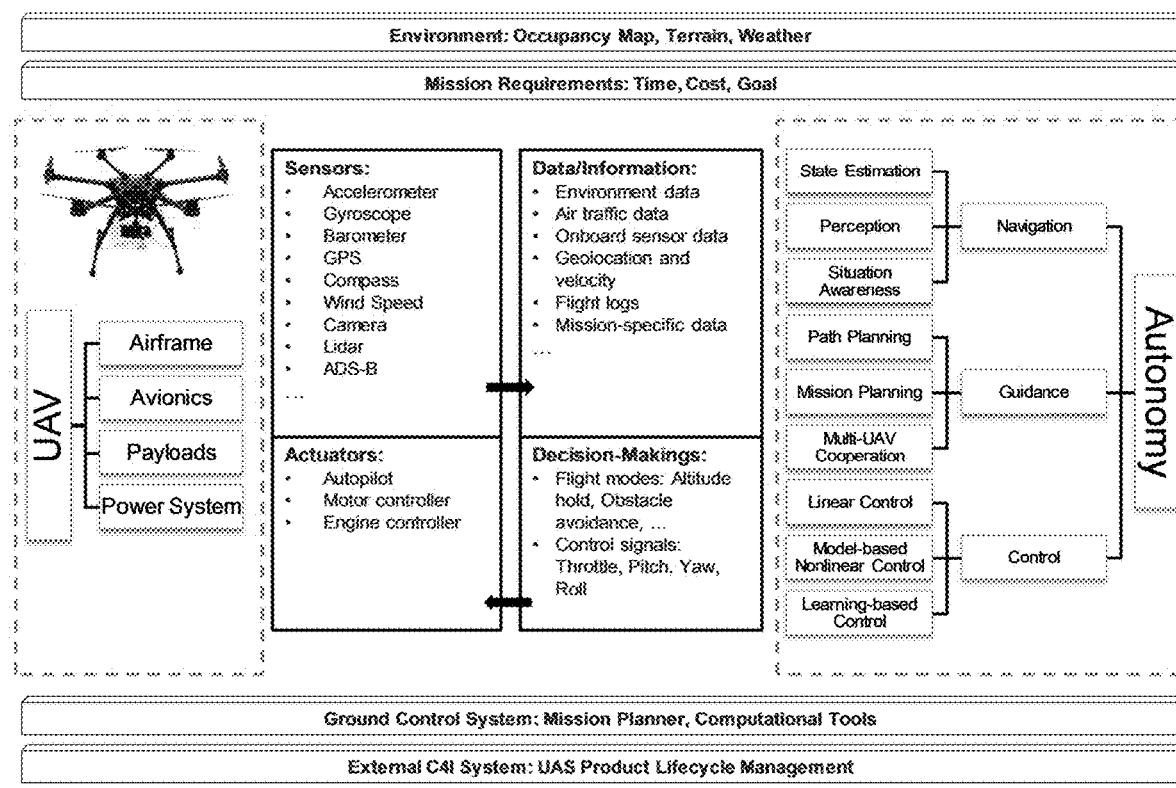
Figure 13:
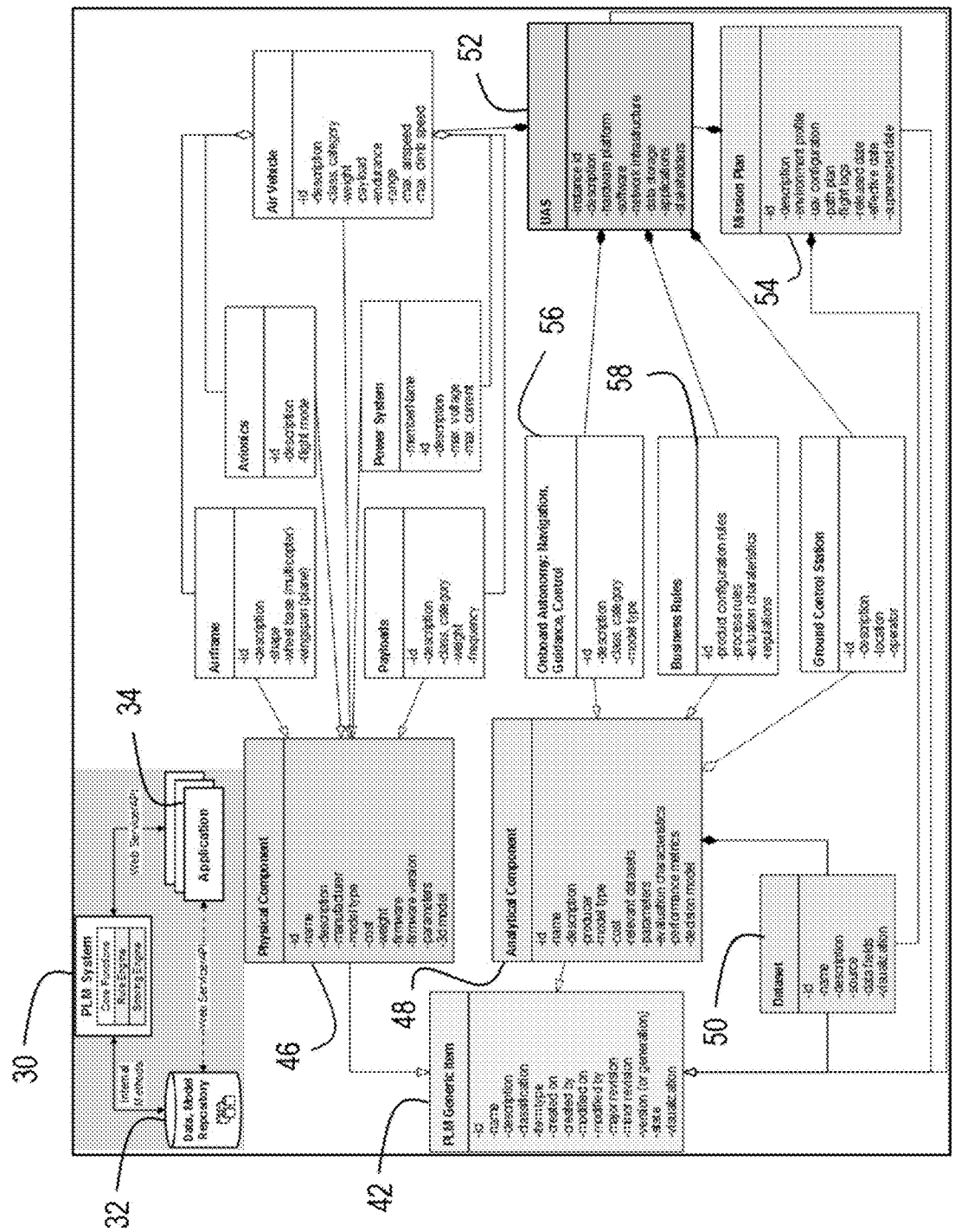
Figure 15:
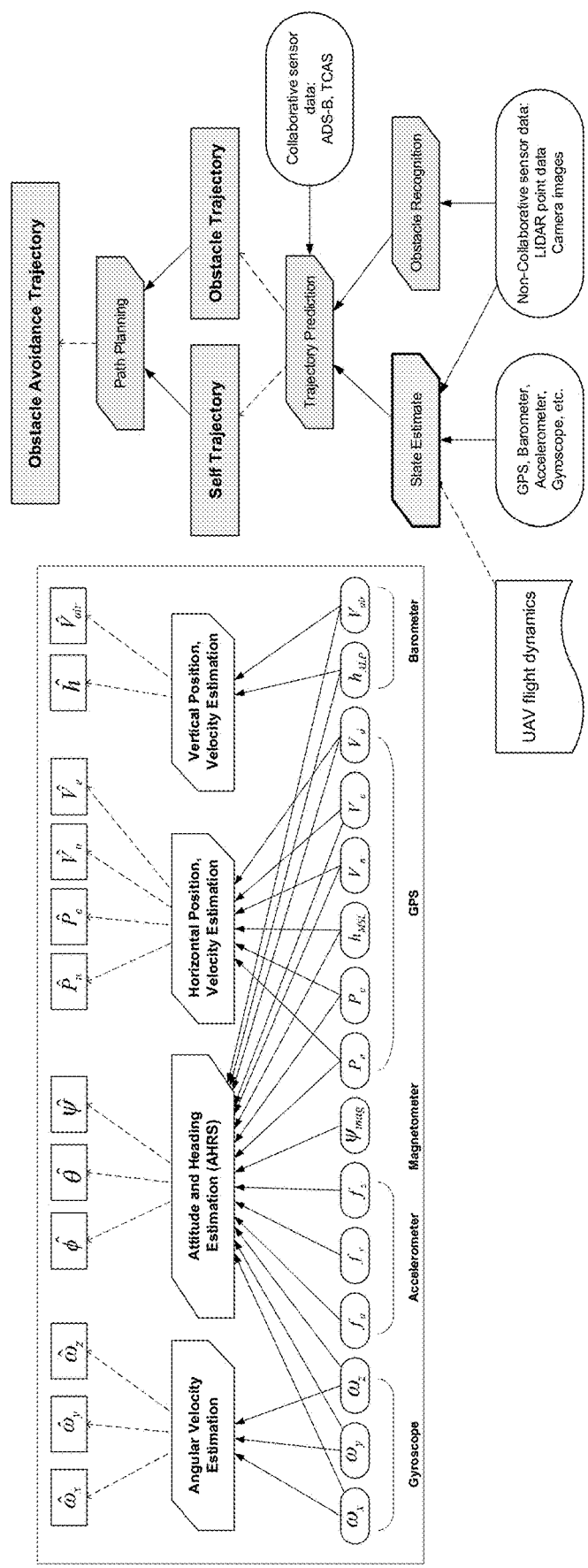
Figure 16:
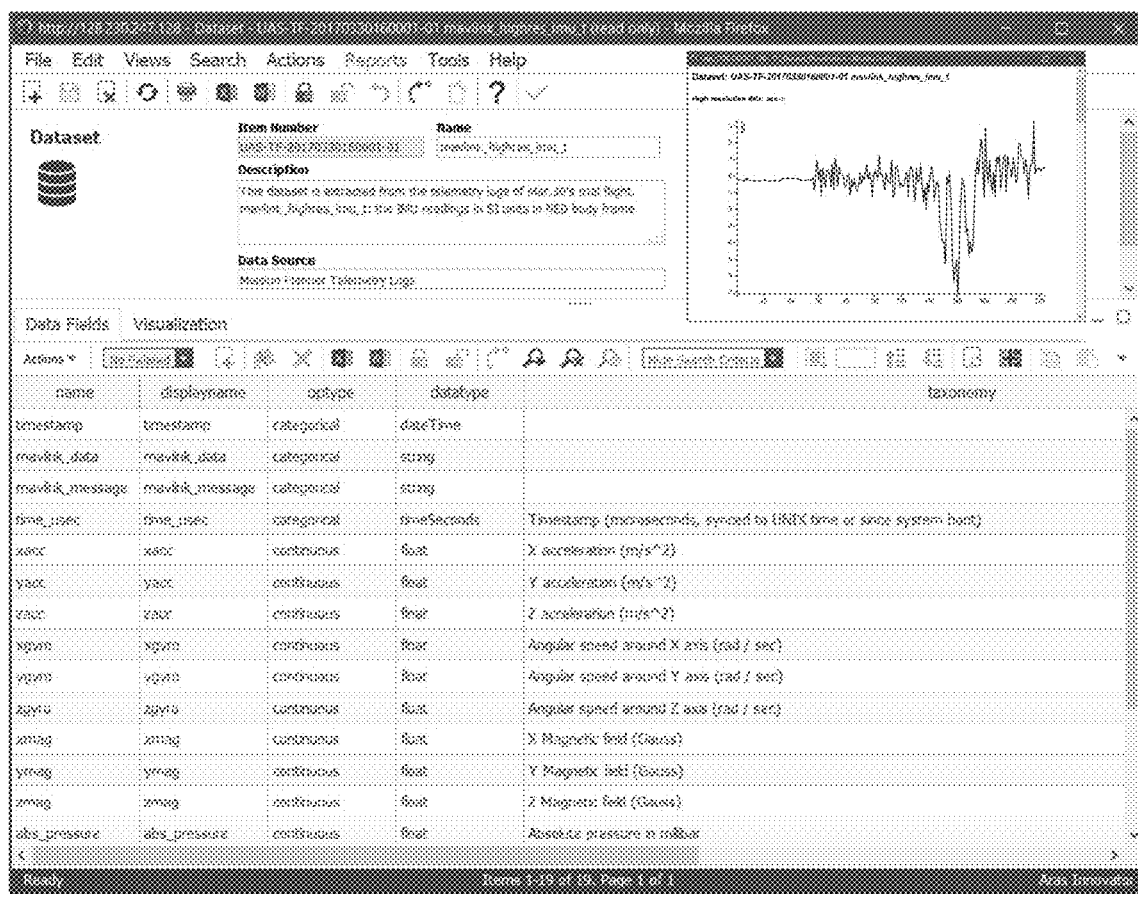
Figure 17:
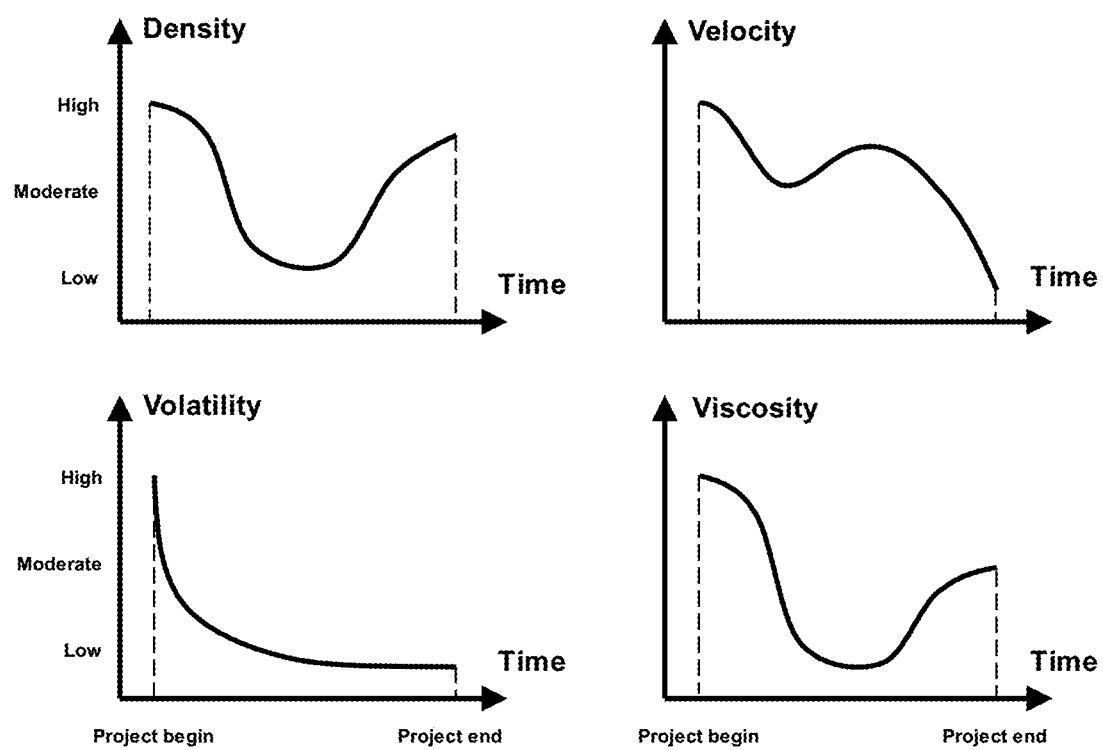
Figure 18:
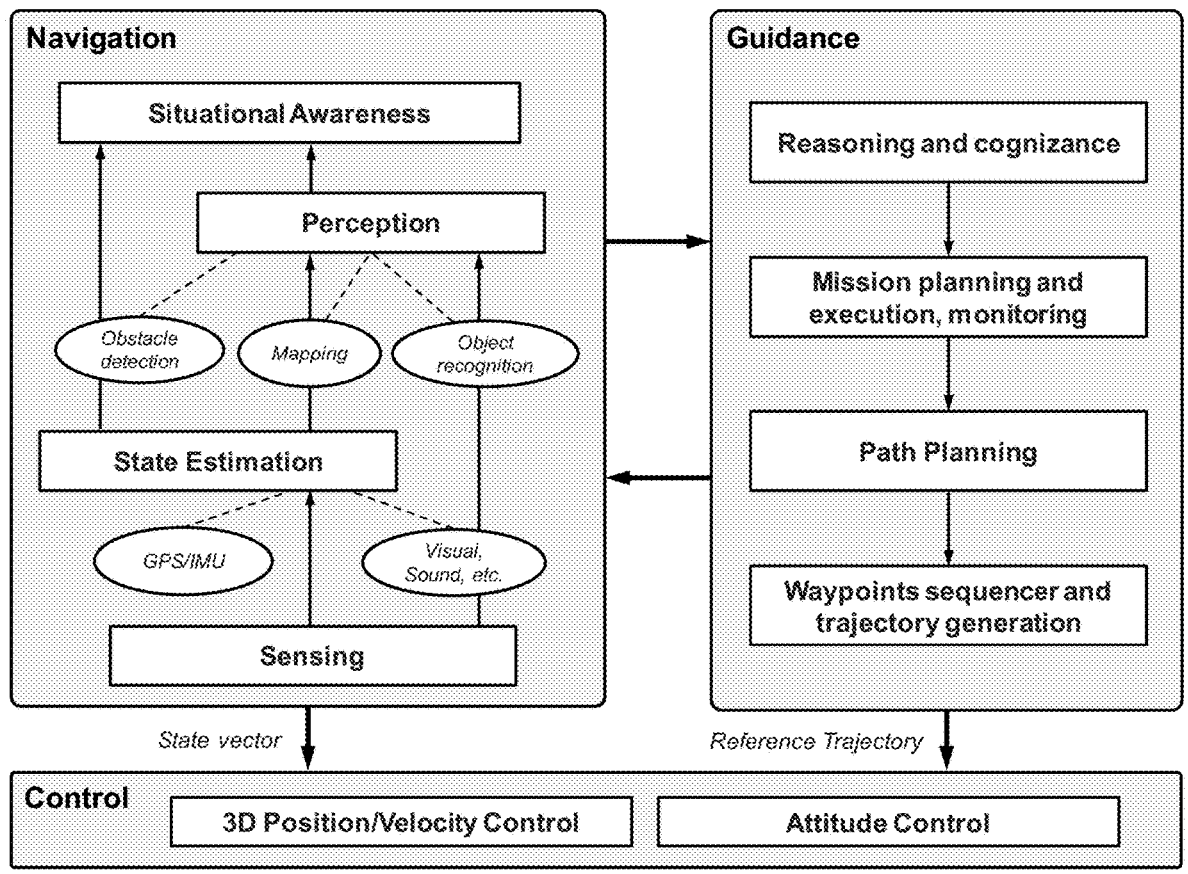
Figure 19:
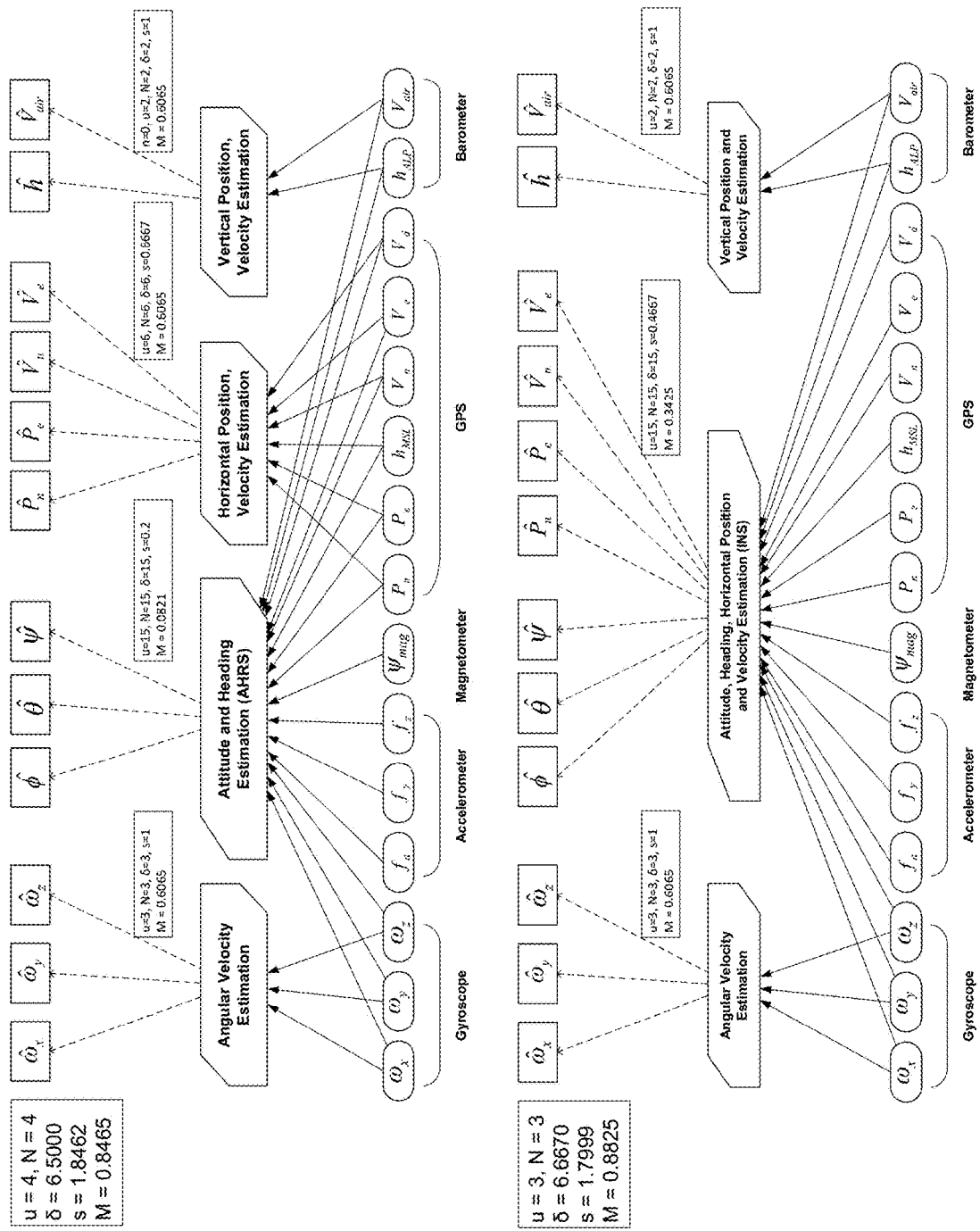
Figure 20:
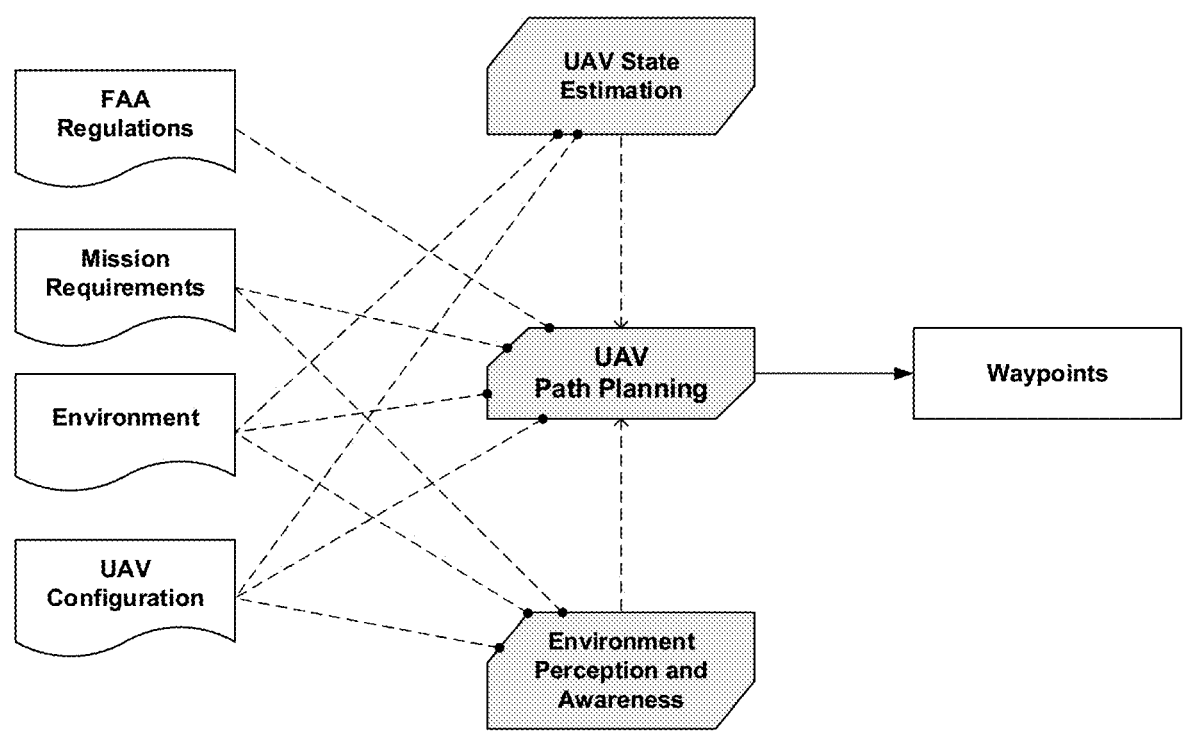
Figure 21:
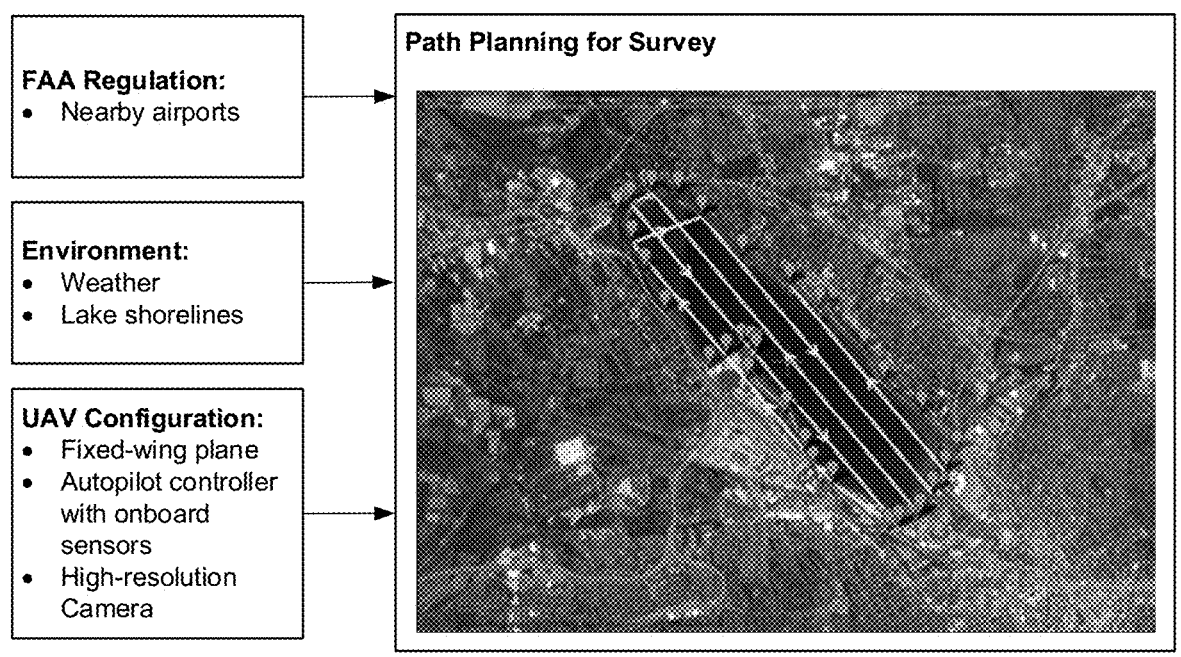
Figure 22:
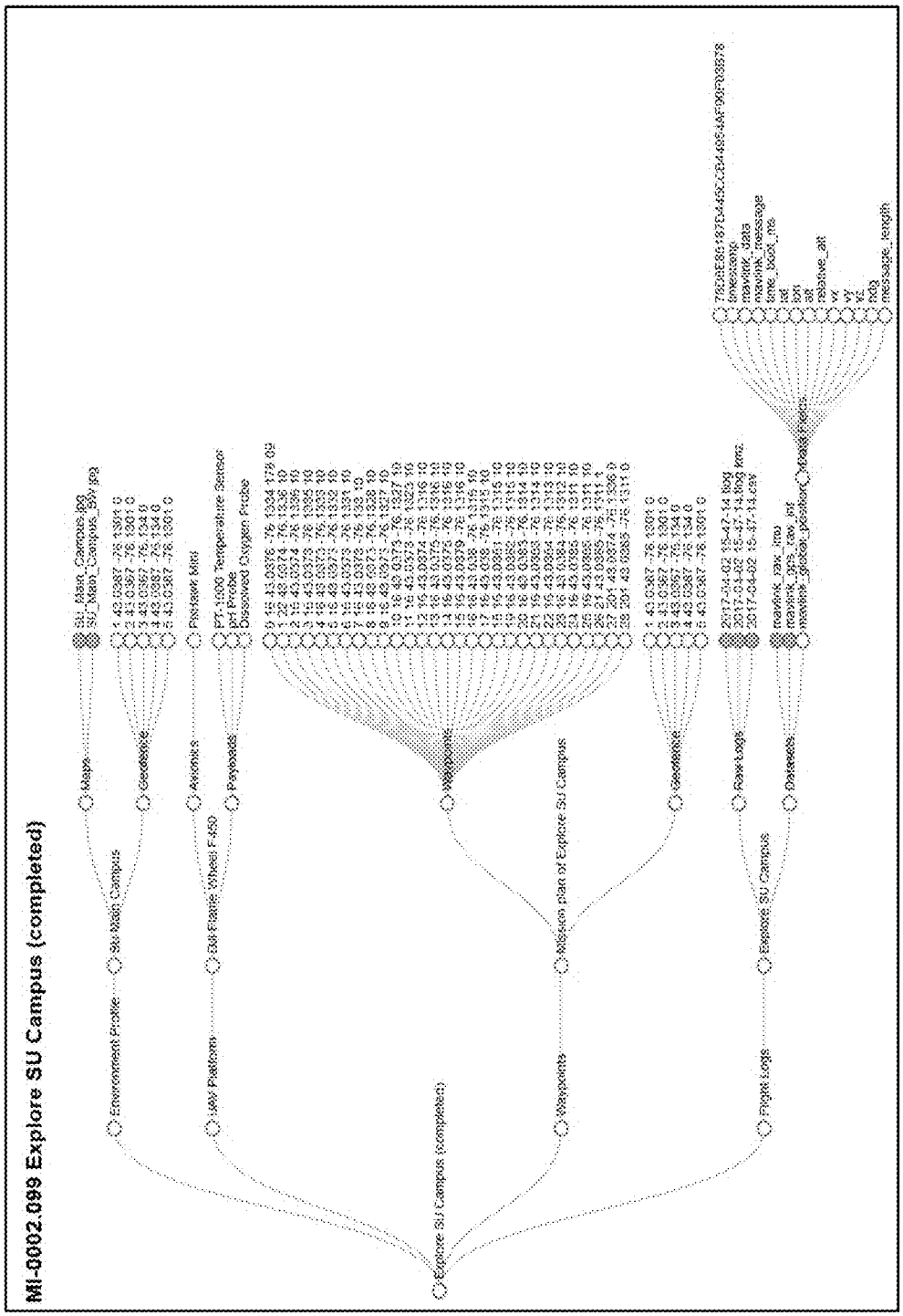
Figure 23:
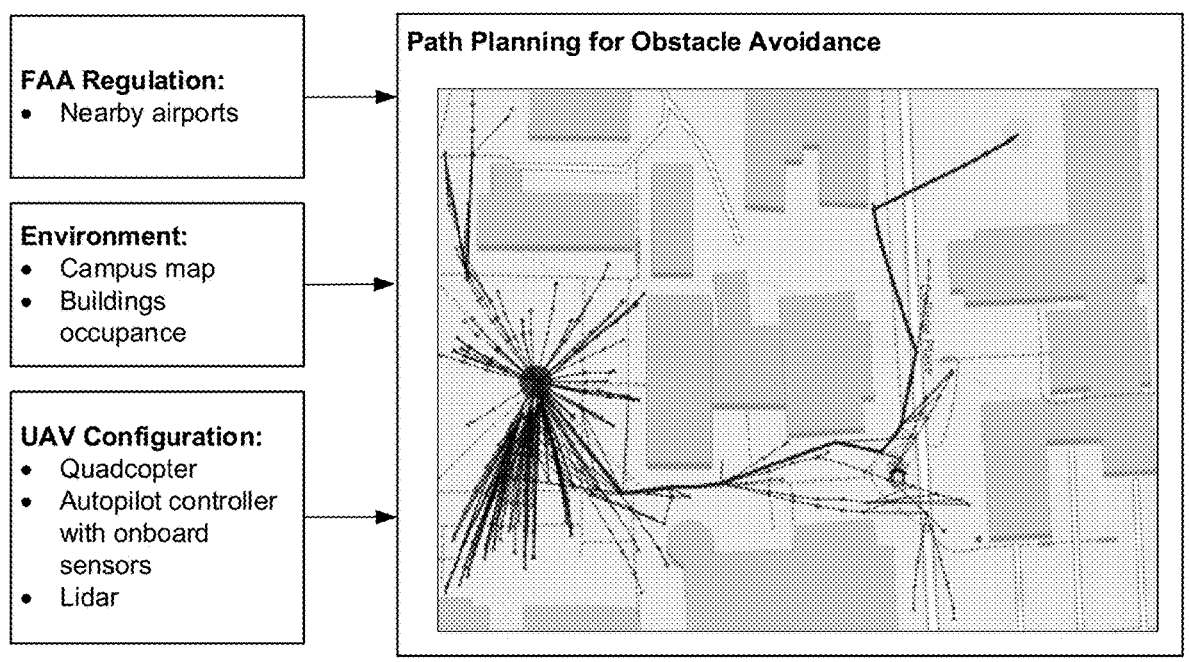

FIG. 10 The first graph is the information flow from the perspective of an engineering team using a smart products lifecycle management platform according to the present invention; The second graph is the information flow from the perspective of a data science team using a smart products lifecycle management platform according to the present invention;

FIG. 11 is a graph of interaction patterns of engineers and data scientists using a smart products lifecycle management platform according to the present invention;

FIG. 12 is a schematic of the generic architecture of an autonomous unmanned aircraft system using a smart products lifecycle management platform according to the present invention;

FIG. 13 is a chart of a data model for an unmanned aircraft system implemented using a smart products lifecycle management platform according to the present invention;

FIG. 14 is a schematic of an unmanned aircraft design concept to be managed using a smart products lifecycle management platform according to the present invention;

FIG. 15 is a schematic of the obstacle avoidance decision model and the state estimation decision model for an unmanned aircraft system to be managed using a smart products lifecycle management platform according to the present invention;

FIG. 16 is a schematic of a flight log dataset and the data field specification for an unmanned aircraft system to be managed using a smart products lifecycle management platform according to the present invention;

FIG. 17 is a series of graphs of the team interaction pattern for developing an unmanned aircraft system using a smart products lifecycle management platform according to the present invention;

FIG. 18 is a chart of the overall structure of the navigation, guidance, and control systems of an autonomous unmanned aircraft system to be managed using a smart products lifecycle management platform according to the present invention;

FIG. 19 is a series of graphs of the state estimation modules based upon AHRS and INS configurations for an autonomous unmanned aircraft system using a smart products lifecycle management platform according to the present invention;

FIG. 20 is a chart of the path planning decision model for an unmanned aircraft system to be managed using a smart products lifecycle management platform according to the present invention;

FIG. 21 is a schematic of a lake survey application for an unmanned aircraft system implemented by a smart products lifecycle management platform according to the present invention;

FIG. 22 is a schematic of the bill of data and materials of an unmanned aircraft system mission implemented by a smart products lifecycle management platform according to the present invention;

FIG. 23 is a schematic of a university campus exploration for an unmanned aircraft system implemented by a smart products lifecycle management platform according to the present invention

DETAILED DESCRIPTION OF THE INVENTION

Figure 1:
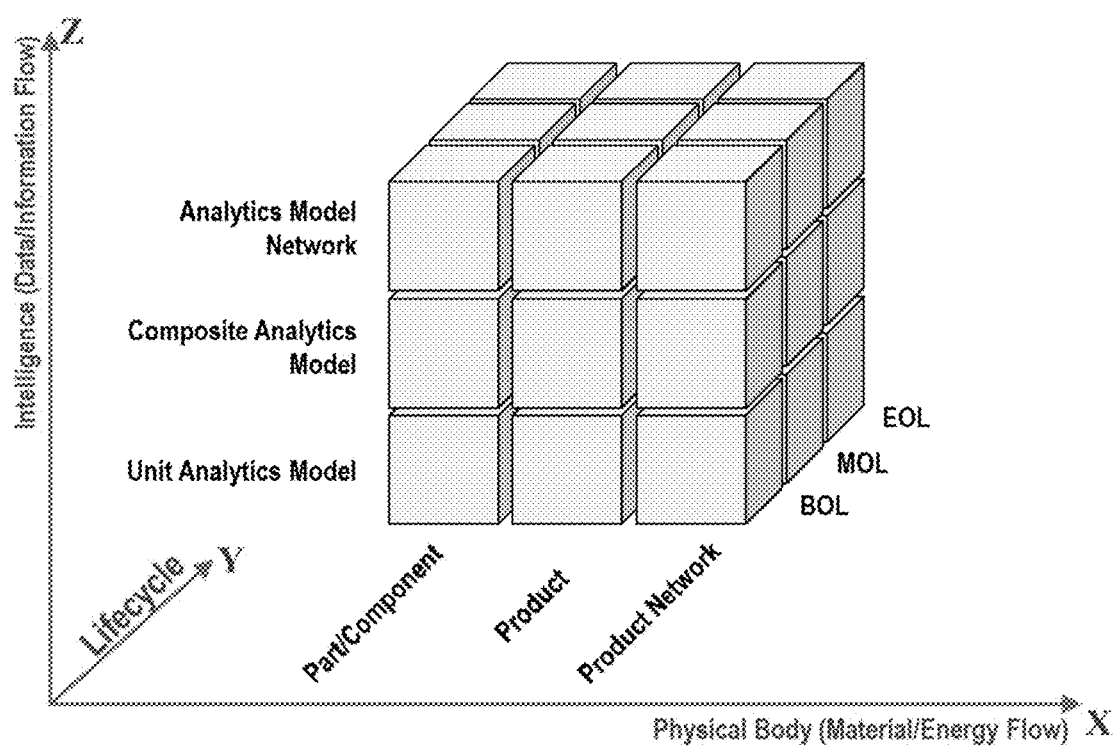
FIG. 1 is a smart products hypercube model that visually represents the information managed by a smart products lifecycle management platform according to the present invention.

Referring to the figures, wherein like numerals refer to like parts throughout, there is seen in FIG. 1 a design space for a smart product. It has been hypothesized as a hypercube model that visually represents the information that needs to be captured, manipulated and managed throughout the product's entire lifecycle. A smart product may be decomposed into two distinct components: (i) the Physical Body that is formed by Physical Components (mechanical parts, electrical parts, network components, sensors, etc.); and (ii) the Intelligence that is supported by various levels of Analytics Models. The physical body is further partitioned into three levels (part/component, product, and networked product) as shown along the X-axis. Similarly, the intelligence is further decomposed and its abstraction levels are marked along the Z-axis. Finally, the Lifecycle stage (Beginning-of-Life, Middle-of-Life, and End-of-Life) information is depicted along the Y-axis. Each cell of the hypercube represents some conditions and the state of a smart product with certain physical form and certain level of intelligence at a certain lifecycle stage. An important feature of this hypercube is that any cell in the space contains all information of all its lower dimensional cells, i.e. any cell itself stores only incremental information.

The information space is then decomposed into four domains: (1) The X-Y planes are related to the traditional Product Lifecycle Management (PLM) domain; (2) the Z-Y planes are related to Analytics Model Lifecycle Management, a relatively new domain; (3) the Z-X planes are related to how physical products interact with analytics models, i.e. Product Configuration and Reconfiguration, at any given decision points; and (4) the whole X-Y-Z space contains information about how a smart product evolves along its entire lifecycle that is referred to as Smart Products Lifecycle Management (sPLM).

This hypercube model is based on two assumptions. The first assumption is that analytics models can be treated with similar features as those of physical components so that they can be built as independent modules, and then be composed on demand. The second assumption is that analytics models could change and evolve over time, i.e. they will go through a lifecycle from cradle to grave. Consequently, a smart product is a result of a certain configuration of physical components and analytics models. It evolves as the configuration changes over spatial and temporal spaces. One critical challenge is to develop a unified data model to generalize the information requirements raised by physical components and analytics models in order to address their heterogeneity as well as increase their composability.

Productization of Analytics Models

There has been a trend in data science community to formalize data analytics projects as a Data Products development process. A data product is defined as a product that facilitates the product's end goal through processing data. This product perspective suggests that data analytics is indeed a production process for producing data products, taking data as materials and delivering results based on data.

Table 1 presents a comparison between a physical component and an analytics model, revealing that they share commonalities in many aspects.

TABLE I

COMPARISON BETWEEN A PHYSICAL PRODUCT COMPONENT AND AN ANALYTICS MODEL

|  | Physical Component | Analytics Model |
| --- | --- | --- |
| End Product | An end-product of manufacturing processes | An end-product of computational processes |
| Development Process | Integrated product design and manufacturing process | A formal knowledge discovery and data mining (KDDM) process |
| Process Planning | Output: Manufacturing process selection Material selection Operation sequence Resource: Raw material, work-in-progress stock Fixture Machine/tool Operations (milling, turning, drilling, . . .) | Output: Attribute selection Analytical model selection Step sequence Resource: Raw data, intermediate data Data extract, transform, load (ETL), data pre/post-processing Algorithms (regression, classification, clustering, association Rules . . .) |
| Authoring and Management Tools | Computer Aided Design/Manufacturing (CAD/CAM) Product Data Management (PDM) Product Lifecycle Management (PLM) | Mathematics/Statistics tools Data Mining packages Application Lifecycle Management (ALM) |
| Visualization Standards/ Guidelines | 2D drawings/3D models ISO 10303 STEP, ISO 14306 JT, IGES (Initial Graphics Exchange Specification), . . . | 2D/3D plots PMML, CRISP-DM, PFA (Portable Format for Analytics), . . . |

Both are produced by certain producers and are used by one or more consumers, to fulfill certain designed functions. Individual component/model is produced from certain kinds of raw materials or raw data, and could be supplied by various vendors. The production of the individual consumes resources, and it needs deliberate production planning. A master model (the final physical product or analytics model) typically consists of a set of sub-models. Each sub-model may be composed of several unit models. Thus, the master model can be represented as an assembly tree. Models with common functions can be standardized for easier reuse, interchange, and composition. A model might be used repeatedly in the same master model or in a different master model, and may have variations; thus, the model utilization history needs be traced over its lifecycle stages.

A repeatable methodology for carrying out data analytics projects has not been well-established. Productizing an analytics model requires it to be planned, developed, deployed, and maintained following certain formal engineering processes. The relevant data, algorithms, variations, versions, product structure, updates or changes, etc., need to be tracked and traced, thus requiring lifecycle management functions (the second domain in the smart products hypercube).

Concepts of the Smart Component Data Model and Lifecycle Management

To avoid ambiguity, the term Physical Component is used to imply the digital representation of a product (which can be a part, an assembly, or an entire product) that has physical form. Also, the analytics model term mainly deals with Predictive Analytics models (out of all data analytics paradigms) without losing the generality of the problem and methodology.

The design of a smart product system requires a continuous evolution of its architecture by upgrading the product already in service, instead of always releasing a new version or derivative. Engineering change is therefore inevitable, and it is necessary to incorporate a changeability into the product architecture to enable the flexibility, agility, robustness, and adaptability of the product system. Modularity is a key principle to realize these changeability characteristics. The tight information dependency between an analytics model and its relevant physical components (e.g. sensors) implies that they should be treated as a component module to increase the modularity of the smart product.

For instance, the Auto-Schedule feature in a smart thermostat may rely on field-motion sensors to detect the user presence in order to develop an accurate heating/cooling control schedule. The data generated from these sensors can also be used to develop the feature that displays different contents according to how far the user is standing from the thermostat, without changing other physical designs, except requiring a bigger screen for better user experience. In this case, the field-motion sensors and analytics models to detect and predict user's location can be an atomic component that is reused by the two features.

The observed commonalities between physical components and analytics models led to the development of the concept of a higher abstraction to unify them. A Smart Component (SC) is defined as a unit system that consists of the necessary physical components (for its form) and analytics model components (for its intelligence implementation) to achieve a reused function. A smart product is then the composition of modular smart components.

Mathematically, a smart component can be represented as below, where PCs are the necessary physical components, AMs are the necessary analytics models, $R_{PC,AM}$ are the dependencies between the physical components and the analytics models, and t indicates the time variable at which all the components information and relationships hold.

$$SC=f(PCs,AMs,R_{PC,AM},t) \quad (1)$$

Figure 2:
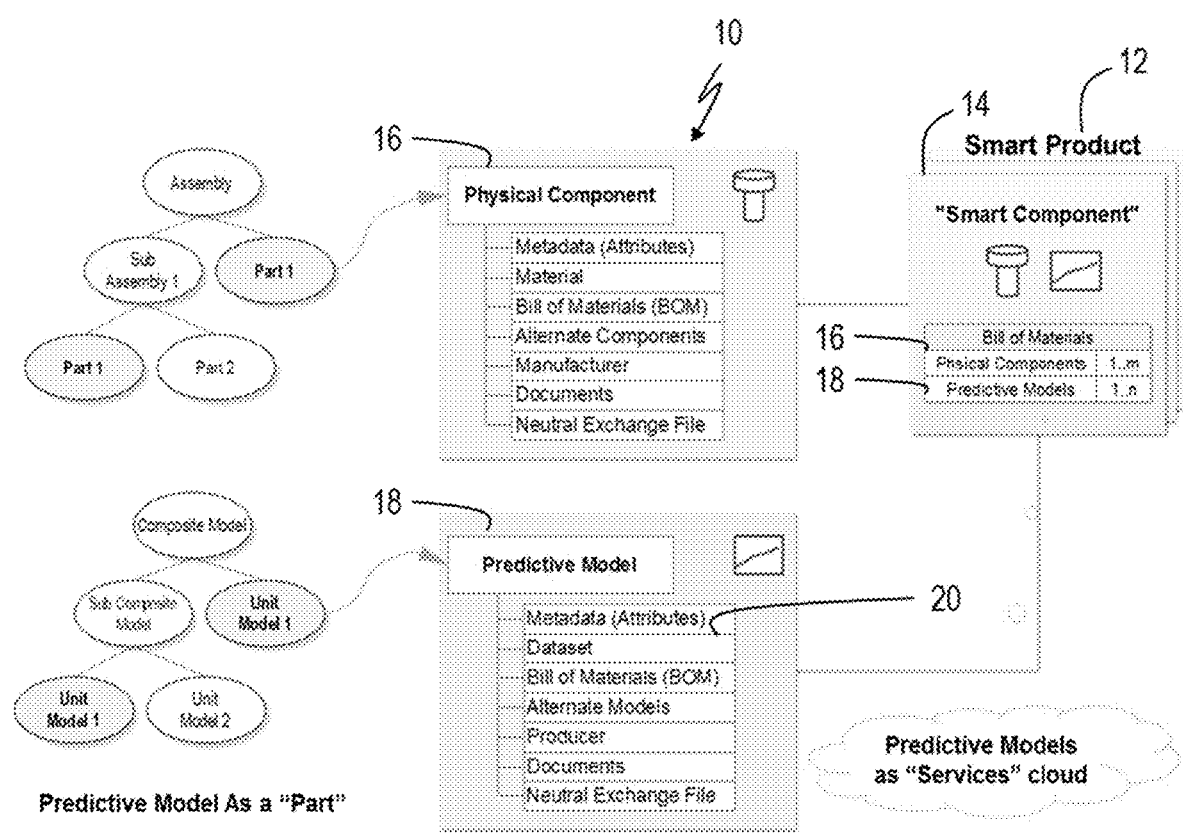
FIG. 2 is a graph of a Smart Component (SC) data model for a smart products lifecycle management platform according to the present invention.

As shown in FIG. 2, smart product management system 10 comprises a smart product 12 having one or more smart components 14. Each smart component 14 has an associated bill of materials defining physical components 16 as well as predictive models 18 that perform analytics. Physical component 16 may comprise metadata, material definition, bill of materials, alternative components, manufacturer information, and neutral electronic files for long-term storage and data exchange. Predictive models 18 contain similar information with the "data" treated as the primary "material" to produce the analytics of predictive models 18.

Since smart component 14 is a superset of physical components 16 and predictive models 18, it can be used to represent physical components or analytics models, if the cardinality constraints are relaxed to allow zero components. Furthermore, the role of an analytics model as a part or a service in a product system can be determined by the spatial relationship, i.e. whether it is embedded inside the product or it runs on an external cloud. Therefore, the smart component definition is complete to cover different roles of analytics models: (1) an analytics model is a Part/Component of another analytics model to fulfill certain functions; (2) an analytics model is a Part/Component of the product system to fulfill certain analytical functions; (3) an analytics model is a Service of the product system to fulfill certain remote analytical functions; (4) and analytics model is a Configuration Rule of the product system; and (5) an analytics model itself is a standalone Product that needs be developed and maintained.

In the following sub-sections, the lifecycle management concepts that are related to the proposed smart component data model are detailed. It starts with the metadata and relationship management of the datasets and the analytics models. It then deals with the composition of unit analytics models, and the composition of analytics models and physical components. Finally, it provides a mechanism for the retrieval and consumption of the resulting, composite, smart component model data. These concepts help build a minimal sPLM system that may (1) serve as a data and model repository for the datasets, analytics models, and physical components used to build smart products, and (2) be able to respond to any requests from either inside PLM or external applications by providing composed/enriched model information using standard XML-based data formats.

Analytics Model and Dataset Management

In the view of analytics models, datasets 20 are the primary "raw materials" used to create and validate an analytics model. A particular dataset 20 can be used to create or validate many different unit analytics models. As an analytics model evolves over its lifecycle, so will its datasets 20. Therefore, the management functions must be able to track the changes in the datasets 20. To do this, composition relationships between datasets 20 and analytics models must be established. A more complicated analytics model can then be built by composing several unit models. Similarly, an analytics model is used to create smart component 14, which is further used to build smart product 12. This hierarchy of heterogeneous building blocks can be generalized using an Item-Relationship-Item structure, in which each item has its own unique identifier, properties and methods. Once such a modular structure is established, all building blocks can be accessed, used, traced and maintained consistently.

Creating analytics models in PLM systems requires importing, mapping, and merging the required analytics model schema (e.g., PMML) with the existing, physical product schema (e.g., ISO 10303 STEP). Model management is one of the formal methodologies to integrate complex models represented by different schema formats. The PMML (Predictive Model Markup Language) metadata model and the CRISP-DM (Cross-Industry Standard Process for Data Mining) process model are selected to implement the analytics model productization idea, because of their successful use in data science community. The DataDictionary and DataField schema defined in the current PMML specification can be used to formally model the dataset items. As noted, the composition of an analytics model and its relevant datasets is necessary to create and validate the model. The lifecycle stages and deliverables defined in the CRISP-DM reference model can be used to determine when an appropriate dataset should be attached to the analytics model and when the analytics model should be used by a smart component.

Modularization of Analytics Models and Composition of Unit Analytics Models

The productization of analytics models transforms the task-oriented data analytics projects into formal product development processes so that the product architecture design of a data product must be rigorously taken into consideration. It should be noted that analytics models are highly data-dependent, and frequently tuned and updated. It is difficult to standardize and reuse the models in different use environments. An analytical model might be discarded or archived once it accomplishes the desired task. Still there could be a feasible way of adopting the known Product Family approach to analytics models.

Two product family formation strategies have been frequently used in physical product development: (1) Scale-based Formation allows one or more scaling variables to be used to stretch or shrink the product in one or more dimensions; and (2) Module-based Formation allows product family members being instantiated by adding, substituting, and/or removing.

PMML supports model ensembles and model chains. The Segmentation element defined in PMML allows users to represent different models for different data segments. This element is also useful to encapsulate multiple models into a single PMML document. The elements defined in the PMML specification can be modeled as different items supported by their hierarchical relationships. For instance, the root PMML element has a relationship to a MODEL-ELEMENT. The MODEL-ELEMENT can be defined as a hybrid item in PLM so that it accepts different analytics models including regression models, neural network models, rule-set models, and so on. Each unit-analytics-model item can then be inserted into a master PMML item or multiple PMML items. This enables a given unit PMML model be reused as demanded.

Configuration rules, which support the selection of a particular model to meet certain conditions, can be created as a separate rule-set model. This model can then be added into the master PMML item and also be linked to the involved unit models. In general, a master PMML item can contain all the necessary unit models plus at least one configuration rule-set model (where we assume all configuration rules can be composed and represented as IF-THEN rules to form a rule-set model).

An analytics model can be modeled at different granularity levels. For instance, we can treat the whole predictive model as a single item with the metadata as its properties, and then attach a PMML document to the item. This is the traditional approach for document-centric data management. It is the simplest way to maintain the document information without losing any raw information because the original file can be referenced as needed. The primary drawback of this approach is that those sub-elements within the PMML document cannot be accessed individually afterwards.

The other approach is to model the sub-elements of the PMML document as items. This approach increases the modularity and reusability of sub-elements that include data fields, data transformations, and models. As for example, two analytics models may use the same data fields but different algorithms; or, two polynomial regression models may have the same model structures with the same mining fields and different predictor coefficients. Modeling sub-elements provides a finer granularity of information for controlling the model structure. This allows users to take the full advantage of PLM functions, such as versioning, change management, and configuration management. However, a compromise must be made since there are additional costs for a finer data management: it means more data needs to be stored, and more complicated relationships need to be traced.

Composition of Physical Product Components and Analytics Models

The efforts to standardize physical product information have lasted for three decades. These standards, like ISO 10303 series and NIST's CPM/OAM models, are originally designed for the traditional product development, and have not been sufficiently extended for a product's data-driven features. Recently, ISO 10303 has released a new application protocol AP242 to capture a product's data model including requirement specification, configurations, 3D geometry, spatial relationship, material and composite structure, machining features, manufacturing specifications and annotations. It also supports product data management (PDM) elements. An important improvement is its External References capability to link any XML-based model as digital representation of a product's master data.

Figure 3:
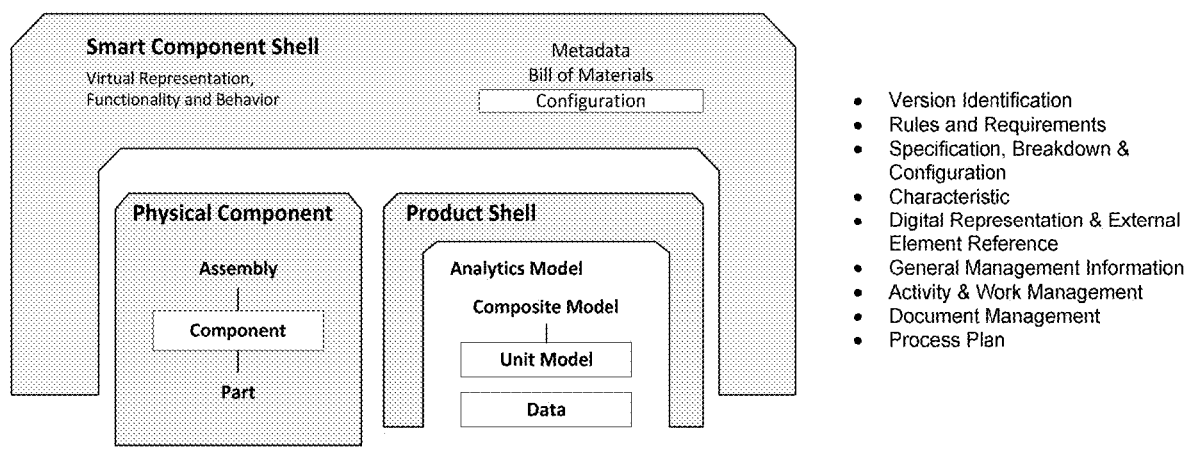
FIG. 3 is a schematic of composition of physical components and analytics models for smart product managed by a smart products lifecycle management platform according to the present invention.

Unlike physical components, an analytics model has no geometric form, but it does have some kind of structures in form of mathematical representation. The 14.0 Component concept defined in the reference architecture for industry 4.0 (RAMI4.0) provides a unified model for description of assets (e.g. sensors and actuators), products, and other intellectual properties (IP) used in a plant. It suggests to use an administration shell to translate an object (or a thing) to an intelligent object. However, the administration shell has to be implemented differently involving real-world scenarios. An analytics model can be encapsulated into a Product Shell to become a product without geometric form (FIG. 3), based on the analogy presented previously. Then, the data model standards in manufacturing domain can be readily reused. The cost is there would be redundant information for analytics models.

Different relationships need to be applied to connect the physical components to part-type analytics models and to service-type analytics models. While this is not differentiated as per the smart component definition, it can be explicitly defined by different configuration rules. The part relationship requires a strict composition relationship between the smart component and the analytics model, i.e., the latter is an inseparable piece of the former. The service relationship is a weaker association relationship, and it is optional to a smart component. Similar to the configuration rules for composition of analytics models, the configuration rules for composition of physical-analytics models can also be represented as a rule-set model.

It is noticed that an analytics model may have far shorter lifecycle and much more variations compared to the physical components within a smart product, which imposes significant impacts on the smart product evolution. A well modularized smart component will reconcile this change impact by standardizing and reducing the variations of the smart component.

Smart Component Model Retrieval and Execution

Figure 4:
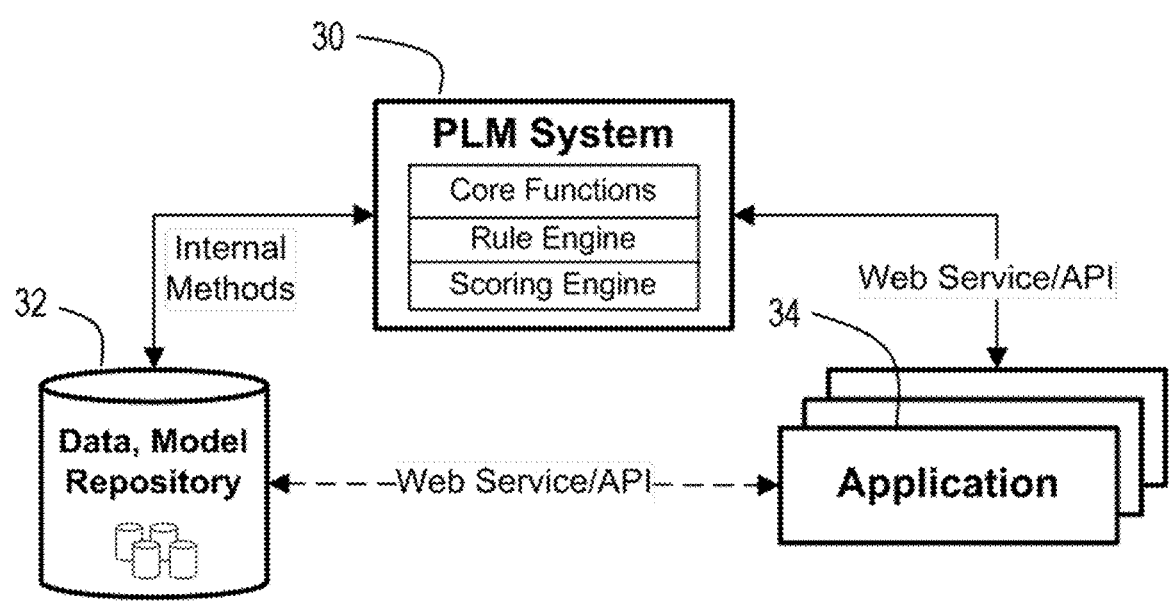
FIG. 4 is a schematic of smart component model retrieval and consumption for smart products managed by a smart products lifecycle management platform according to the present invention.

A PLM-based generic framework to retrieve and utilize the smart component model data is illustrated in FIG. 4. A PLM system 30 provides a repository for all available instance data and instance models. PLM system 30 also stores all the necessary lifecycle information such as states and revisions of the data and the models. Smart component 14 has physical component 16 metadata for self-description and predictive models 18 as its intelligent parts. Thus, it can detect and predict its own behaviors based on the data collected for the component. Without execution, however, smart component 14 does not behave. It provides a cyber environment where smart component 14 can either be (1) executed inside the PLM system 30 using PLM built-in execution engines and methods, or (2) retrieved and utilized by an external application through some web services or application programming interfaces (API).

The data and models in the repository 32 may be exposed directly to external applications (see the dash line between the repository 32 and the application 34, FIG. 4). PLM system 30 should be capable of returning information regarding any physical product component model, dataset, unit predictive model, and any of their compositions, corresponding to different levels of queries requested.

Example 1: Smart Component Data Model—A CNC Machine Case

In this section, we illustrate the implementation details for the proof-of-concept of the smart component data model, using a CNC machine equipped with a power prediction module. The power prediction module contains analytics models that are created based on several parameters related to the machining process. The module can be used with real-time process data. The open source PLM platform, Aras Innovator PLM[1], was used for the implementation. The core PLM functions provided by this platform allow a focus on implementing the proposed data model and applications.

[1] The Aras Innovator PLM is developed by the Aras Corporation (www.aras.com)

The PLM Platform

Aras Innovator is an object-oriented, web-based PLM platform as part of a service-oriented architecture (SOA). Aras Innovator uses the concepts Item and Relationship to abstract arbitrary objects and connections between objects. Everything in Aras Innovator is an item, which is an instance of an ItemType, which itself is an item too. Each item has a 32-character GUID (Globally Unique Identifier). An item may have relationships to other items; a relationship is defined by Relationship Type, which is also an item. The relationship type rule is defined by using three properties: the source (parent) item, the related (child) item, and the relationship item. This Item-Relationship-Item architecture is suitable to capture our conceptual model described earlier.

Aras Innovator uses two workflow models to support lifecycle activities: state-based and activity-based. The state-based workflow model, which is named as the Lifecycle Map, tracks the state of an item during its lifecycle. A lifecycle map consists of a series of states (actions and steps) and transitions (paths between the different states) that an item instance traverses during its existence. The activity-based model, which is named as the Workflow Map, tracks the work that people actually performs. A workflow map consists of activities and paths, in which each activity represents a unit of work that must be performed. An activity contains the task list, the assignment to users responsible for these tasks, notifications, and time spent on the activity. A workflow map can be accessed from the entry of a lifecycle state, and in turn the activities within the workflow map can promote the lifecycle to the next states.

Case Description

Energy consumption is an important performance indicator. Power consumption is a measured scalar value, which is used to calculate the energy consumption by integrating power over machining time. Therefore, the ability to predict power consumption enables one to monitor the energy efficiency of a CNC machine; and then control it proactively, if necessary. Let's consider a scenario in which the CNC machine executes roughing operations to produce turned-parts from cylindrical work pieces. It produces a weekly batch of 350 parts made of aluminum and 150 parts made of steel. We collect time series data regarding three process parameters: feed rate, spindle speed, and cutting depth. Table 2 lists the ranges of these process parameters:

TABLE II

RANGE OF PROCESS PARAMETERS IN MACHINING

| Parameter | Unit | Aluminum | Steel |
|---|---|---|---|
| Feed rate | mm/rev | 0.1-0.5 | 0.2-0.6 |
| Spindle speed | rad/s | 94-209 | 94-126 |
| Cutting depth | mm | 1-4 | 2-6 |

The dataset is used to train a cubic polynomial-based regression model as shown in the equation (2).

$$\text{TOTAL\_POWER} = B_{00} + \sum_{k=1}^{3} B_{1k} \cdot \text{FEEDRATE}^k + \sum_{k=1}^{3} B_{2k} \cdot \text{SPINDLE\_SPEED}^k + \sum_{k=1}^{3} B_{3k} \cdot \text{CUTTING\_DEPTH}^k + \sum_{k=1}^{3} B_{4k} \cdot \text{CUTTING\_DIAMETER}^k \quad (2)$$

The regression model uses four machining process parameters as predictors: feed rate, spindle speed, cutting depth, and cutting diameter. Here, the cutting diameter is the outermost dimension of the work piece being turned, and can be calculated from the cutting depth. The process parameters vary depending on the work piece materials. In the example, two parts made of two different materials are considered. The resultant two unit-regression models have the exact same structures but different intercepts ($B_{00}$) and coefficients ($B_{11}$-$B_{43}$) for individual predictors of their regression equations. The two unit-regression models can be then individually used. They can also be composed into a single power prediction model, using material as a parameter to create the model configuration rule. Then, the power prediction model is used as a part by any compatible CNC machine product and predicts the machine's behavior regarding energy consumption.

Analytics Model Metadata and Lifecycle Management

The hierarchy of the PMML elements can be mapped to the Item-Relationship-Item structure of the PLM system. For example, the root PMML element and the DataField element can be modeled as two item types, and can be connected with a DataDictionary relationship. Similarly, the MiningSchema is modeled as a relationship to connect the root MODEL-ELEMENT with the MiningField element.

Figure 5:
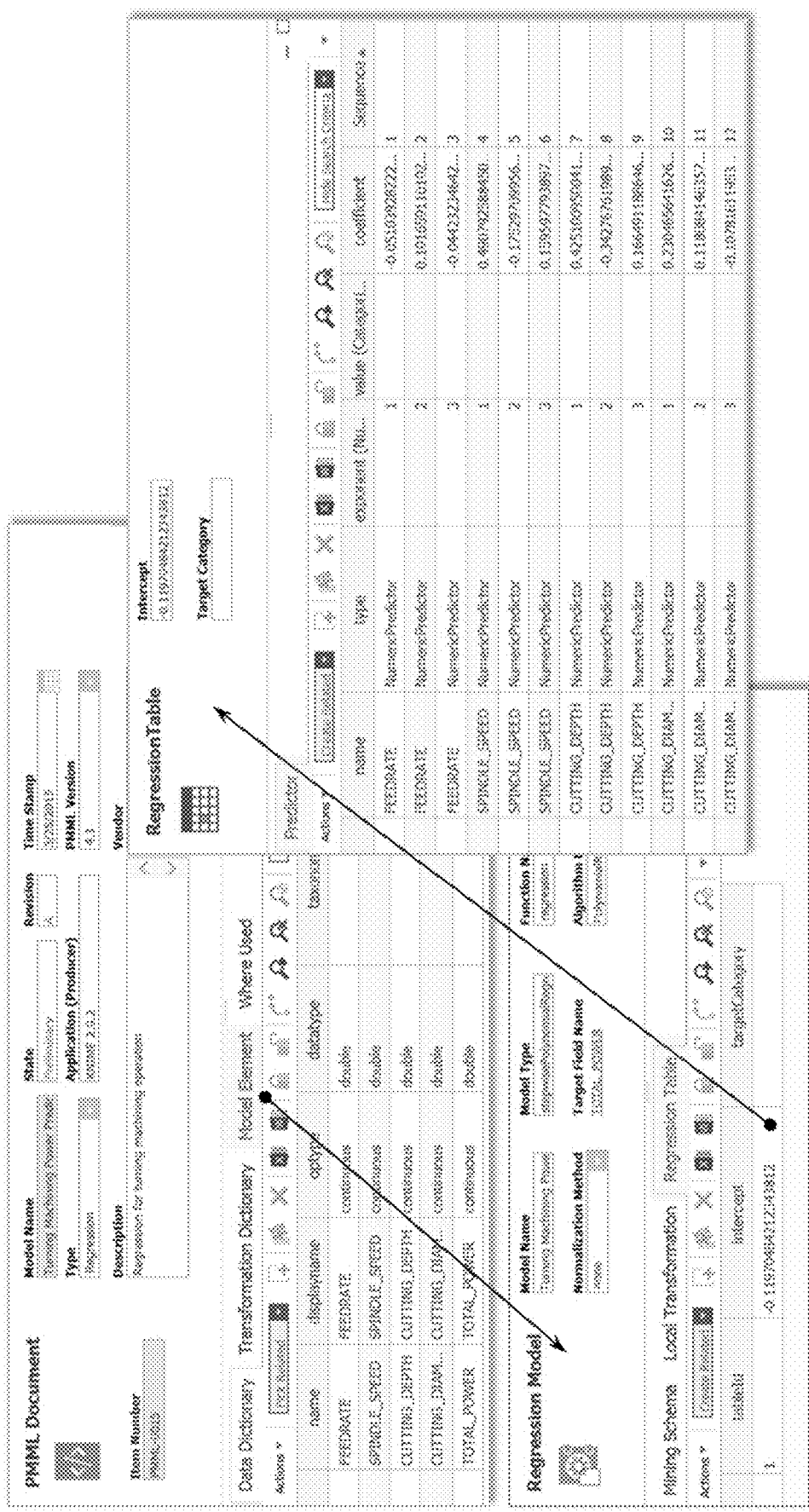
FIG. 5 is a chart of an exemplary regression model's metadata modeled in a smart products lifecycle management platform according to the present invention.

FIG. 5 shows the implementation of the regression model for aluminum material and its master PMML item to invoke the model. The PMML's elements are now organized conforming to the Item-Relationship-Item structure—each element's metadata has been collected and presented in a client form intuitively. This example PMML document has five data fields (four for the predictors and one for the prediction) and one regression model. The regression model contains one regression table that consists of descriptive information of each predictor.

Figure 6:
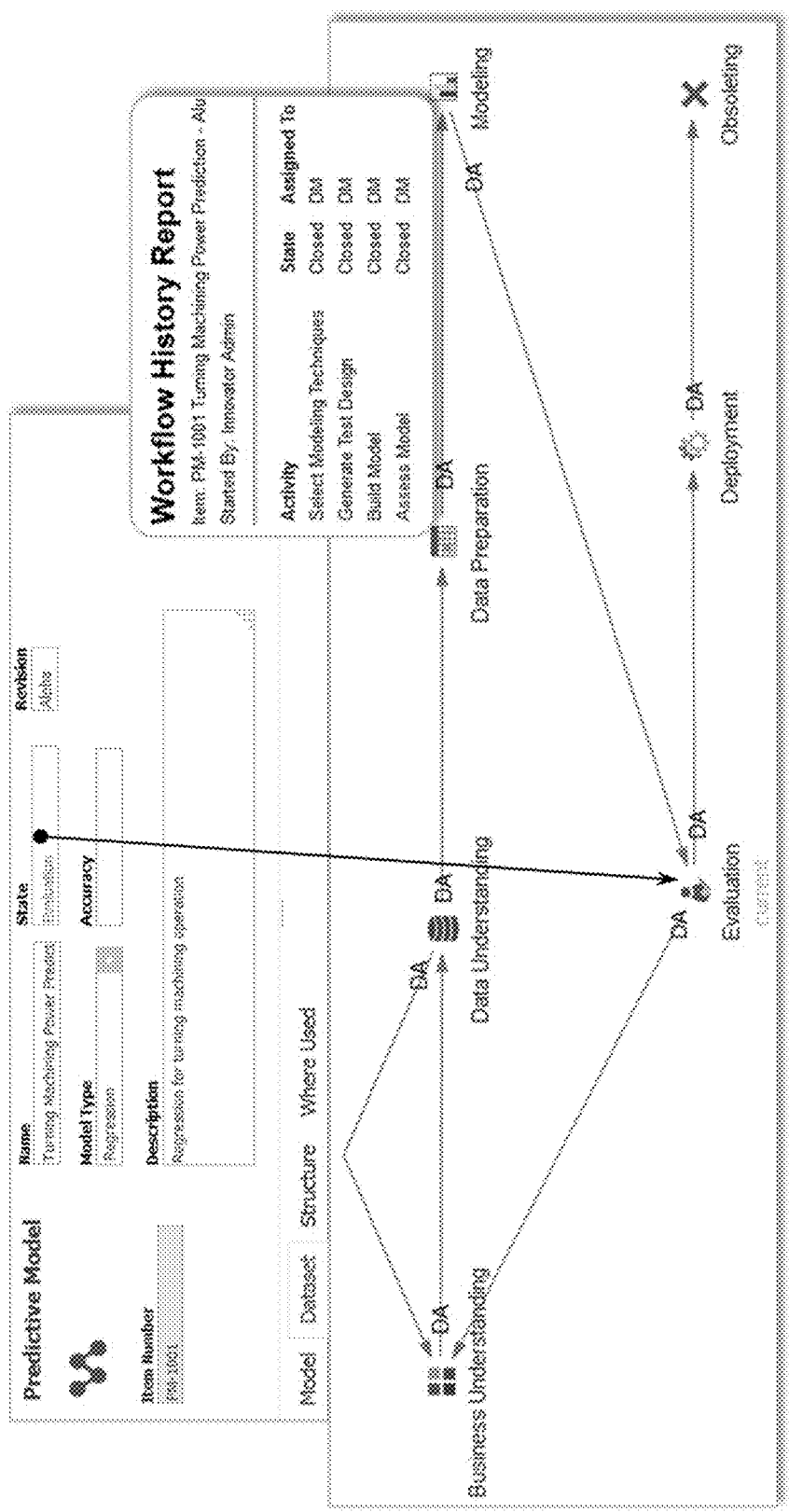
FIG. 6 is a lifecycle map of a regression model for an exemplary application of a smart products lifecycle management platform according to the present invention.

The phases and generic tasks defined in the CRISP-DM model can be implemented in the PLM system as one lifecycle map and several workflow maps. Detailed tasks and deliverables of each phase can also be modeled. FIG. 6 shows a predictive model that has completed the Modeling phase, and is currently in the Evaluation phase of its lifecycle. Its version is labeled as Alpha, since it has been neither released nor deployed yet. The workflow model enables different participants to interact with one another following certain business rules. For illustration purpose, we assume the model development process involves two user-groups DA and DM, which stand for Data Analytics and Data Mining respectively, who have different roles in different lifecycle stages. A user in the DM group focuses on the activities and tasks during the modeling phase. S/he (1) requires the preprocessing work to be completed by other users in the DA group, and (2) submits the completed predictive model to appropriate users in the DA group for further post-processing.

The lifecycle model in the PLM system can also capture the appropriate relationships between the analytics model and its relevant datasets. For instance, the training dataset can only be used in the Modeling phase, and a newer training dataset may be used to update the analytics model during a model-revision process.

Smart Component Model Composition and Consumption

A smart product's master model can contain one or more physical product components and one or more analytics models. For the CNC machine case, the two regression models are treated as two different analytics models and as two parts of the machine (see FIG. 7). There are different ways to categorize these analytics models: either in the power sub-system of the machine, or in the control sub-system of the machine—the choice depends on how the manufacturer builds the machine. Furthermore, the power prediction model can be easily reused by different CNC machines. It can also be updated or replaced when new data or more effective algorithms are available. These updates can be recorded and traced afterwards.

On the other hand, when a part produced by this machine is considered, the energy consumption predictive model becomes a service for the part because the predictive model functions outside the part. The rationale to determine the two types of relationships (part and service) is lying on the fact that the variable values are collected from the machine's built-in sensors instead of from the part side.

Both the CNC machine and the part can also use other analytics models as services; for instance, a process planning model that defines the operation sequence to produce machined parts. A model to predict manufacturing operations for geometric features of a prismatic part can be comprised of two unit models: a rule-set model and a tree model. The rule-set model is for non-hole features such as a face, a slot, or a pocket; the tree model is for hole features. These two unit models can be combined together to make prediction for different feature categories. If the CNC machine is equipped with this process planning model, it will be aware of the CNC machine as a resource and will take consideration of it with other constraints when any process planning process is initiated.

Figure 7:
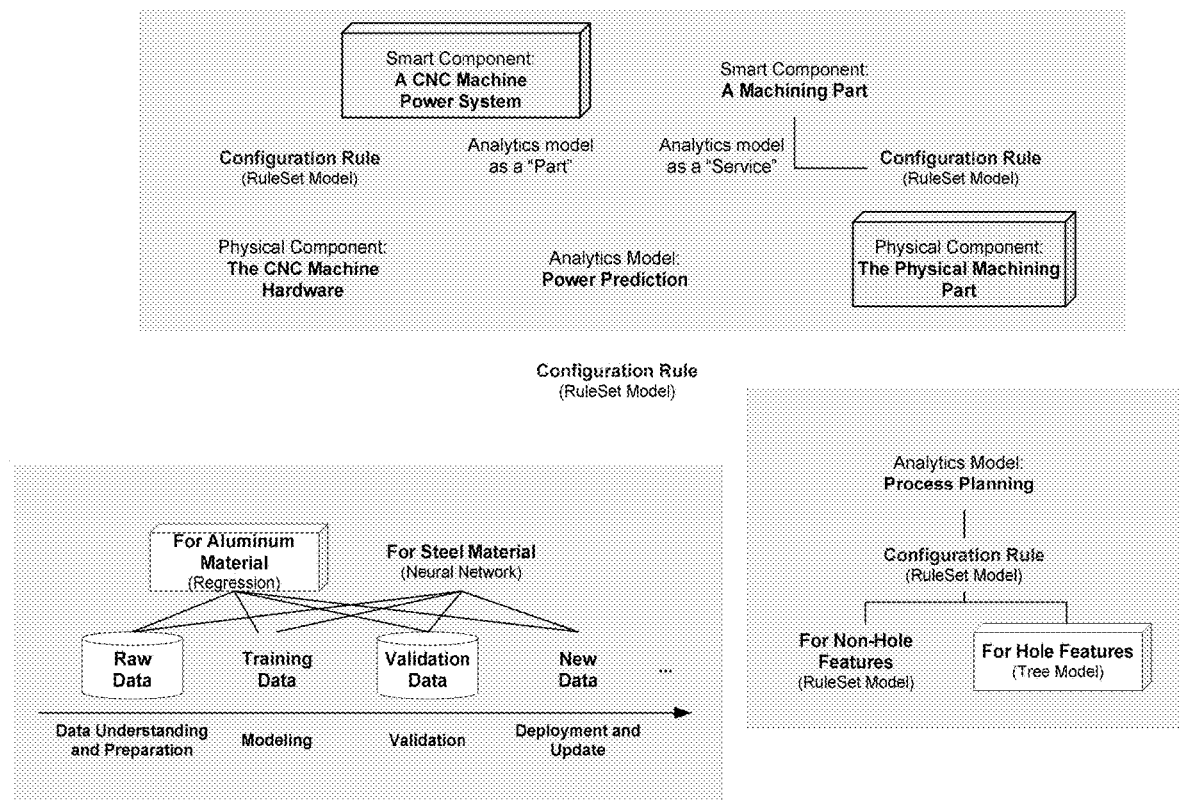
FIG. 7 is a chart of the different levels of composition for an exemplary application of a smart products lifecycle management platform according to the present invention.
Figure 8:
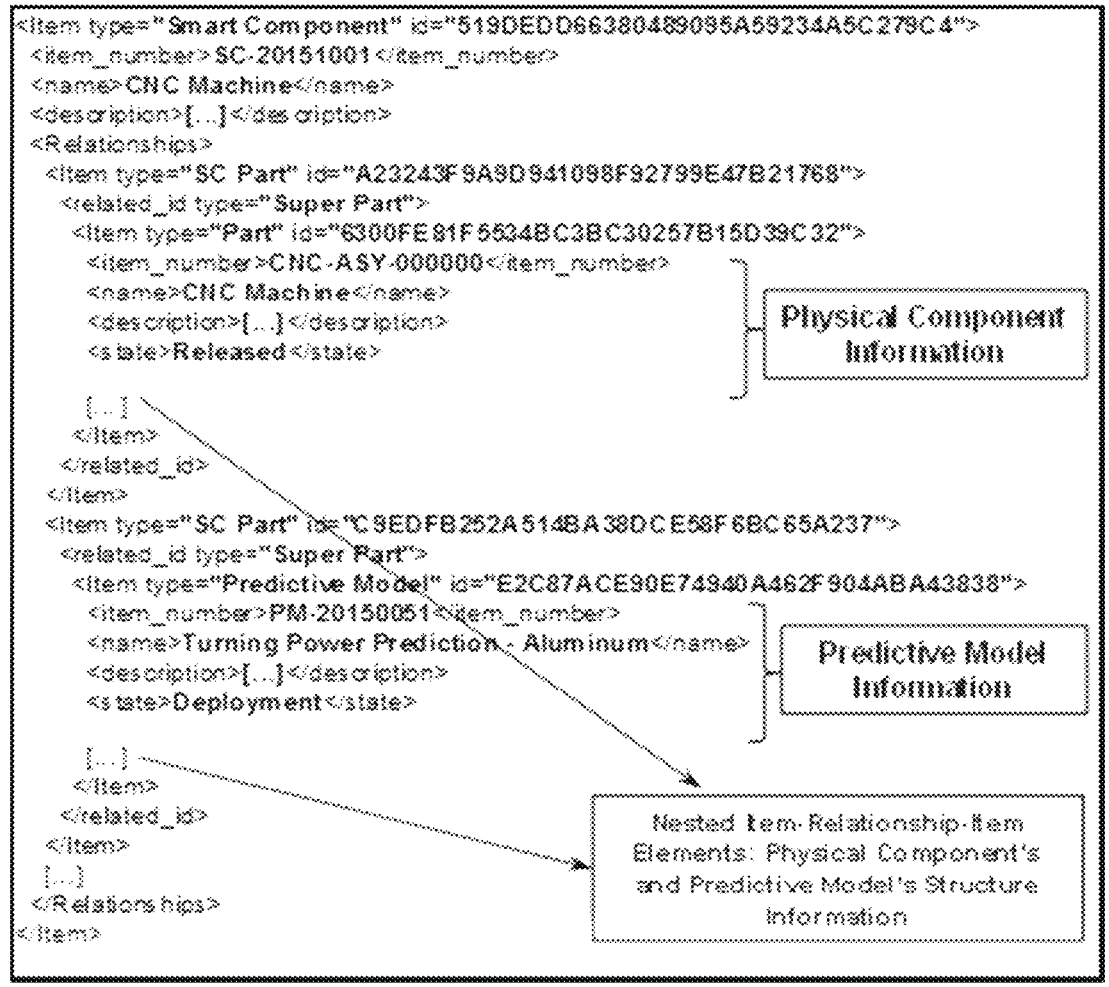
FIG. 8 is an XML-based representation of an exemplary application of a smart products lifecycle management platform according to the present invention.

FIG. 7 shows the different levels of composition to form the smart CNC machine with energy prediction features. The composite smart product model can then be retrieved at any level from inside PLM and/or by outside applications. FIG. 8 shows a skeleton XML data from the PLM system that responds to a model query. The response to the query includes retrieval of (1) all the necessary model data such as physical components, predictive models and their relevant datasets, and (2) all lifecycle information such as lifecycle stages and revisions. These data can be further parsed by the rule engine and the scoring engine embedded inside the PLM system or used by an external application.

Creating smart products requires developing two types of components—physical products (for physical bodies) and analytics models (for intelligence)—in a multi-disciplinary design space. We contextualize this design space in a Smart Products Hypercube that allocates the physical components design on one dimension, analytics models design on another dimension, and time-based lifecycle stages on the third dimension.

Based on the observed commonalities between physical components and analytics models, we proposed a Smart Component data model to consistently compose both at the same time as a uniform, hybrid model. Productizing analytics models allows them taking advantage of the PLM capability that is traditionally designed for physical product development. The intelligence embedded in the analytics models, allows the associated smart component to obtain important insights over its lifecycle states. The data model enables engineers, data scientists, and other stakeholders to collaborate on a common platform to develop smart products. It also serves as the basic foundation for building smart devices, smart equipment, and smart services, which are the key components of a smart manufacturing system.

The PMML specification and the CRISP-DM process model have been adopted by industrial practitioners, by open source toolkits, and by commercial software for data analytics projects. They are integrated based on an open source PLM platform for representing the smart product's schema and instances at different stages of its lifecycle. This integration has further enhanced the PLM's overall capability for analytics model lifecycle management. The proposed technique in implementing the analytics model in PLM could provide a reference for future extension or enhancement of the current PMML specification. The lifecycle and workflow models available in the PLM system are leveraged to track and trace both unit and composite models in various use case scenarios. This makes it easier to update, replace, and maintain unit predictive models.

Figure 9:
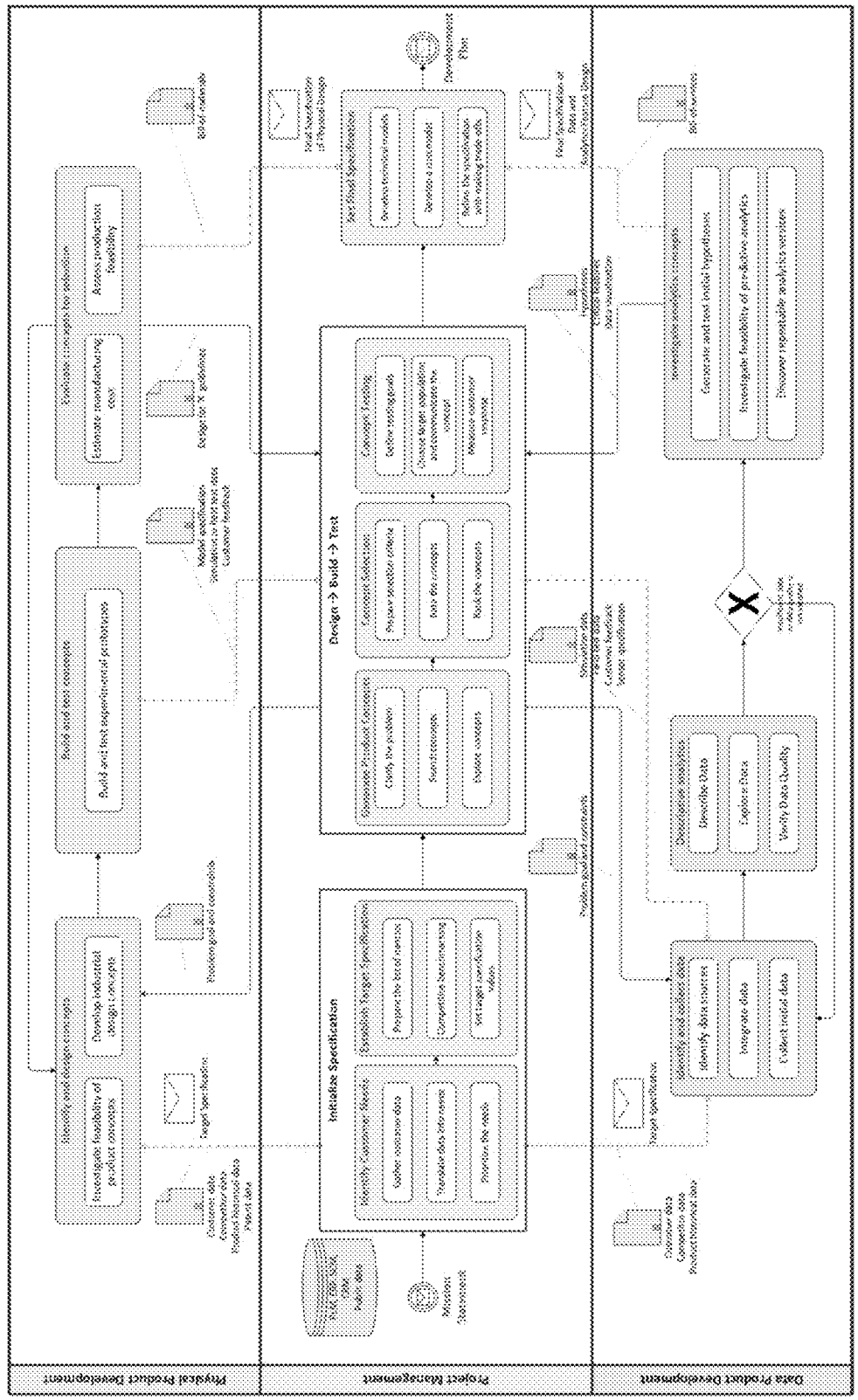
FIG. 9 is a graph of an integrated process model for new product development with data-driven features in a smart products lifecycle management platform according to the present invention.

Example 2: Smart Products Concept Development Process—An Unmanned Aircraft System Design A smart products lifecycle management platform also needs to support the collaboration of engineers and the new experts, data scientists, who have been incorporated into the product development team. An integrated process model for new product development (NPD) with data-driven features is seen in FIG. 9. To illustrate, we focus on the Concept Development stage of a new product development process. An effective collaboration in the fuzzier front-end of the process will help avoid wasteful rework in the downstream processes and will enable the creation of better products that maximizes the potential of both the physical and analytical components of the product. That is to say, product engineers and data scientists need to work together to formulate the problem, explore, screen, and evaluate the potential concepts, and eventually select one or more optimal concepts to finalize the product specification. The main engineering tasks prescribed in the NPD concept development stage include Investigate feasibility of product concepts, Develop industrial design concepts, Build/test experimental prototypes, Estimate manufacturing cost, and Assess production feasibility. Design engineers usually fulfill the first three tasks and manufacturing engineers typically fulfill the last two tasks. The tasks defined in the CRISP-DM that are relevant to concept development (for data products) are mainly in the Business Understanding and Data Understanding stages. Concept development should focus on the role of translating business needs into technical implementation specifications. Therefore, the CRISP-DM's Business Understanding stage is aligned with the NPD's Planning stage, and only the tasks defined in the Data Understanding stage are counted as concept development activities for data products. These tasks include: Collect data, Describe data, Explore data, and Verify data. It is noted there are implicit activities when exploring data: hypotheses modeling and testing (descriptive analytics), followed by discovering data mining opportunities (predictive analytics). These exploratory activities are analogous with the concept investigation and design activities in NPD, and shall be differentiated from the later Modeling stage of the CRISP-DM. Therefore, these activities are explicitly added in the Data Understanding stage and term them as Generate and test initial hypothesis, Investigate feasibility of predictive analytics, and Discover repeatable analytics services.

In summary, the engineering activities are grouped as Identify and design concepts, Build and test concepts, and Evaluate concepts for selection; similarly, the data science activities are grouped as Identify and collect data, Descriptive analytics, Verify data quality, and Investigate analytics concepts. This setting reflects the time lag for data scientists' activities compared to the engineers' activities.

In FIG. 9, the middle lane in the model represents the project management (PM) team, who follows a stage-gate-based NPD process. It takes a Mission Statement as input and produces the approved Development Plan. The first two tasks (Identify customer needs and Establish target specification) involve the marketing team, management team, customers, and other stakeholders. The engineers and data scientists participate in these preparation stages, and their collaboration is mainly brokered by the PM team. The dominance of outgoing flows indicates the information brokerage and dissemination role of these tasks. The design-build-test task group comprises of the core activities with which the engineers and data scientists work to collectively solve the problem. Detailed tasks are conducted in the individual team activities. Engineers and data scientists can use face-to-face communications if the organizational structure and geolocation allow, and the PM team can focus on ensuring the coordination of the tasks. This task group is also where the high rate of iteration takes place. The last task, Set final specification, again involves stakeholders from many disciplines to complete the development plan. The dominance of incoming flows indicates the information integration workloads of the task.

The upper lane is the engineering team, who focuses on the engineering tasks for the development of physical product. They translate the customer needs into the technical specification and use the technical specification to come up with the optimal solution for the physical design. Engineers employ well-established Design for 'X' principles (e.g. Design for Manufacturing and Assembly, Design for Environment, etc.) to evaluate and refine the product concept. The final specification includes a bill-of-materials of the physical components and target values of their properties. The Identify and design concepts task has larger information integration workloads while the Evaluate concepts for selection has larger information dissemination workloads.

The lower lane is the data scientist team, who focuses on data processing and analytics modeling tasks for the development of the data product. They translate the customer needs into the data specification and use the data specification to come up with the optimal data analytics solution. Since data quality greatly impacts the analytics results, there must be a gateway to go/kill the decision to the Investigate analytics concepts task. The final specification includes both the data specification and the analytics feature specification. Similarly, a bill-of-services shall be included if the analytics feature can be further decomposed into reusable services. Intuitively, the Identify and collect data is dominated by information collection workloads and the Investigate analytics concepts task is dominated by information dissemination workloads.

The engineering and data analytics tasks are coordinated by the PM design-build-test tasks; hence, there are two implicit gateways located before and after the design-build-test task group. It is noted the test data from a simulation model, a physical prototype, or a field test can only be obtained after such a model/prototype has been built. Therefore, there is a message flow from the Build and test concepts task to the Identify and collect data task of a later iteration for data scientists. In addition, the sequence flows across the discipline boundaries also carry the necessary message information; we do not draw explicit message flow symbols for a clearer representation.

Decomposition of Information Content for Individual/Subgroup Tasks—the Meso-Level and Micro-Level Models Now we discuss the details of the in/out information content flows related to the individual task or task group. In this level, we employ an IDEF0-based notation to decompose the information related to unit collaborative design activity into four categories: Intra-disciplinary design information (I), Cross-disciplinary design information (C), External design information (E), and Design information output (O). This notation was originally proposed by Austin et al. (1999) termed as IDEF0v in order to facilitate collaborative building-design process, while the IDEF0 (Integrated computer aided manufacturing DEFinition for function modeling) technique was developed in order to better communicate and analyze manufacturing systems in an attempt to improve productivity.

The information flows for the engineering and data science activities are depicted in FIG. 10. The intra-disciplinary, cross-disciplinary, external, and output information for the engineers are encoded as $I_{eng}1$~3, $C_{eng}1$~3, $E_{eng}1$~3, and $O_{eng}1$~3. We explicitly encode the potential cross-disciplinary information received from the data scientists as $C_{eng}1$~3-DST. On the data scientists' side, $I_{dst}1$~4, $C_{dst}1$~, $E_{dst}1$~4, $O_{dst}0$~4, and $C_{dst}1$~4-ENG are the intra-disciplinary, cross-disciplinary, external, output information, and cross-disciplinary information explicitly from the engineers. The information content of each information flow is identified by revisiting the standard activities defined in the NPD and the CRISP-DM. For instance, $I_{eng}1$ consists of historical data of the product and production, while $O_{eng}1$ includes the concept classification tree and combination table. A detailed description of the information content is listed in Table 3.

TABLE 3

INFORMATION FLOW FOR ENGINEERS AND DATA SCIENTISTS IN NPD CONCEPT DEVELOPMENT

| Information Source | Engineers' Perspective | Data Scientists' Perspective |
|---|---|---|
| Intra-disciplinary design information (I) | $I_{eng}1$: Historical data of the product, production, and operation<br>$I_{eng}2$: Physics-based principles, Hardware specification, Iterative test results<br>$I_{eng}3$: Product cost model, Design for 'X' principles (DFA, DFM, DfS, etc.) | $I_{ds}1$: Data time period, Data format, Sample size, Data transformation, Data storage, Data batch or streaming processing<br>$I_{ds}2$: Statistical techniques (e.g. sampling, plotting, hypothesis test, correlation test, etc.), Data visualization<br>$I_{ds}3$: Data cleaning, Missing data manipulation, Feature extraction<br>$I_{ds}4$: Predictive analytics options (e.g. regression or classification), Feasible machine-learning algorithms (e.g. supervised or unsupervised learning), Performance evaluation metrics |
| Design information output (O) | $O_{eng}1$: Concept classification tree and combination table<br>$O_{eng}2$: Feasible concepts for selection<br>$O_{eng}3$: The physical solution to the design problem, and the final physical product specification | $O_{ds}1$: Raw datasets<br>$O_{ds}2$: Dataset specification (sample size, field specification), Hypotheses documentation and test report, Data visualization and interpretation<br>$O_{ds}3$: Data quality validation reports<br>$O_{ds}4$: The analytics concept solution to the design problem, and the final analtyics product specification |
| External design information (E) | $E_{eng}1$: Customer survey, Product review, Competitive benchmarking, Government data, Public data, etc.<br>$E_{eng}2$: Customer feedback, Supply chain data, Government data<br>$E_{eng}3$: Public data (labor cost, material cost, sustainability index, etc.), Regulation | $E_{ds}1$: Customer survey, Product review, Competitive benchmarking, Government data, Public data, etc.<br>$E_{ds}2$: Data source provision, Data specification<br>$E_{ds}3$: External certification service<br>$E_{ds}4$: Customer survey, Product review, Competitive benchmarking, Government data, Public data, etc. |
| Cross-disciplinary design information (C) | $C_{eng}1$: Target product specification, Customer needs, Historical operation data<br>$C_{eng}1$-DST: Data real-timeliness requirement, Descriptive analysis, Statistical hypothesis, Critical feature identification, Machine learning concepts, Data visualization<br>$C_{eng}2$: Customer feedback, IT and OT support systems<br>$C_{eng}2$-DST: Reusable analytics services, Machine learning/Data mining model concepts<br>$C_{eng}3$: Manufacturing process, Material inventory, Labor cost, Lifecycle inventory<br>$C_{eng}3$-DST: Machine learning algorithm complexity, Data quality assurance measures, Predictive performance measures | $C_{ds}1$: Project plan, Target product specification, Customer survey, Historical product, production and operation data, IT and OT support systems<br>$C_{ds}1$-ENG: Product technical specification (Bill-of-Materials), Simulation data, Field test data<br>$C_{ds}2$: Target product specification, Customer needs<br>$C_{ds}2$-ENG: Concept specification, Customer technical needs, Competitive technical benchmarking, Historical product technical specification, Product shape and size, User interface, Control and communication interface with external environment, Simulation model specification (design variables, constraints, performance metrics), What-if scenario description<br>$C_{ds}3$: Sample size requirement, Data quality assurance measures, Corporate policy<br>$C_{ds}3$-ENG: Product and production specifications<br>$C_{ds}4$: Feasible concepts integrating hardware, software, analytics, and other disciplines; Feasible ergonomic design for human interactions; Customer feedback; Production and operation constraints; Supply chain constraints; IT and OT infrastructure<br>$C_{ds}4$-ENG: Hardware specification (data storage, processors, sensors, network connections, etc.), Sensor location, Simulation model specification, Constraints imposed by Design for 'X' principles. |

Interaction Patterns and Characteristics

Awareness, Access, Knowledge-transfer, and Problem-solving have been identified as four levels of interaction patterns in a collaborative product development network. The information decomposition highlighted in FIG. 10 shows several interesting factors of the information dependency between the two team groups: engineers and data scientists. First, the external and cross-disciplinary information reveals the shared information by the two groups, indicating this information can be brokered by a common dedicated team or a higher-level project management team (if there is one). Second, the cross-disciplinary information coming from the two groups indicate engineers and data scientists may need to directly communicate with each other for effectiveness and efficiency, calling for an appropriate organizational structure or geolocation arrangement. The information content in this flow not only need to be aware of and accessed by each group, but also transfers domain-specific knowledge to the counterpart for collective problem-solving. The output information of each activity is not only for the next activity of the same discipline, but it might also be consumed by the collaborative tasks in the other discipline since an effective process requires each subsequent task to maximize the utility of the stable information available from the previous task.

There have been defined four parameters to evaluate the characteristics of an information flow, by analogizing with a fluid flow that a fluid changes its properties with respect to space and time. These four parameters—Density, Velocity, Viscosity, and Volatility—are employed to evaluate the characteristics of an interaction node that changes the information flow properties. To be more specific, the Density is defined by the number of intermediate interaction nodes. The Velocity refers to the speed of the incoming information at an interaction node. The Viscosity reflects the degree of conflict (presence of contradictory information components) at the interaction node. The Volatility denotes the associated uncertainty in the information content, format, and/or timing. As a starting point, we define each parameter to have three levels: Low, Moderate, and High.

The cross-interaction characteristics between the engineers' tasks and the data scientists' tasks can then be derived as shown in FIG. 11. At the beginning, a large set of intermediate nodes need be communicated to identify the data sources and interests. The velocity of incoming data is fast, data/information present high conflict, and uncertainty is high. As the process progresses, more data and information is available, the design problem is more constrained, therefore the concepts are filtered and get less ambiguous. When it comes to integration and evaluation of the concepts, the viscosity would again increase because multiple performance measures have to be compromised.

Case Study: Concept Development of an Unmanned Aircraft System (UAS)

Unmanned aircraft systems (UAS) are popular in civilian applications and have covered a broad range of areas including environment monitoring and protection, disaster/crisis search and rescue, aerial photography/filming, pipeline survey, to name a few.

The present invention includes the development a UAS platform for a Water-Quality-Sampling application requested by a civil engineering scientist. The usual practice in this area is to collect small water samples for lab analyses because many water properties cannot be measured in the field. If the properties can be measured in the field, they require an onsite monitoring system or a suitable vehicle to carry the instruments. In our case, the scientist requested a UAS to measure the water properties including temperature, pH, dissolved oxygen, etc. A UAS platform could access a hazardous environment, be more flexible than an on-site water monitoring system, and be faster than other vehicles (e.g. a boat). Most importantly, a UAS platform could be a cost-effective solution with the capability to adapt itself to conduct different missions, if properly designed. The overall requirements and the initial system specification are shown in Table 4:

TABLE 4

THE SYSTEM REQUIREMENT AND THE TARGET SPECIFICATION

| Requirement | Target Specification |
| --- | --- |
| Is lightweight to be carried and operated by a single scientist | The total weight is less than . . . kilograms with all the necessary payloads. |
| Is cost-effective | The total cost is less than . . . dollars. |
| Can hover over the water area | The UAV can hover 1 meter above the water surface without moistening the onboard payloads. |
| Is safe and has certain levels of autonomy | The UAV can detect and avoid a static or dynamic obstacle within a radius 5 meters surrounding it. |
| Can measure a range of water quality properties at predefined locations | The UAV can measure pH, temperature, dissolved oxygen using onboard sensors. The accuracy of measurement should fall between . . . |
| Can collaborate with other UAVs to achieve a mission | The UAV can work with at least one another UAV to simultaneously measure the water quality properties at a predefined location without sacrificing the safety. |
| Can quickly adapt to different water sampling missions | The UAV can replace with different sensors to sample different water quality properties. |

The UAS Generic Architecture

The modular UAS architecture consists of five distinct elements: (1) the Unmanned Air Vehicle (UAV) element includes the air frame, propulsion and the avionics required for flight control; (2) the Payload element includes the sensors systems, associated recording devices, or associated control/feedback mechanisms; (3) the UAV Control System (UCS) element incorporates the functionality to generate, load, and execute the mission and to disseminate information to various command, control, communication, and intelligence (C4I) systems; (4) the Launch and Recovery element incorporates the functionality required to safely launch and recover the UAV; and (5) the Data Link element consists of the vehicle data terminal on the UAV and the control data terminal which may be located on the ground or air platforms. Control of the UAS is achieved through the UCS and the data link elements.

The data-driven nature of a UAS arises from its transition from an automated system to an autonomous system. The autonomy of an UAS is defined as the UAS's own abilities of sensing, perceiving, analyzing, communicating, planning, decision-making, and acting/executing, to achieve its goals as assigned by its human operator(s) through a designed human-robot interface or by another system that the UAS communicates with. The autonomy enabling functions for a UAS can be grouped into three subsystems: Navigation, Guidance, and Control. Navigation is the process of monitoring and controlling the movement of an air vehicle from one place to another. It is a highly data-intensive process involving data acquisition, data analysis, and extraction and inference of information about the vehicle's states and its surrounding environment with the objective of accomplishing the assigned mission successfully and safely. Guidance is the driver of the UAS that exercises the planning and decision-making functions to achieve the assigned mission or goal. It takes inputs from the navigation system and generates reference trajectories and commands for the flight control system. Finally, control is the process of manipulating the inputs to a dynamical system to obtain a desired effect on its outputs without a human in the control loop.

FIG. 12 depicts the core elements of an autonomous UAS's generic architecture, which consists of its physical architecture, autonomy architecture, cyber-physical interfaces, and the supporting subsystems.

The Multidiciplinary Team and a Collaborative PLM Platform

A research group teamed up with experts from several disciplines, including experts from both academia and industry (Table 5):

TABLE 5

THE MULTIDISCIPLINARY TEAM

| Role Group | Role Description |
| --- | --- |
| Civil Engineering | The user of the UAS; Providing the domain knowledge regarding the water quality monitoring application. |
| Mechanical Engineering | Designing the UAS mechanical parts and their configurations; 3D modelling and 3D printing of custom parts. |
| Computer Science and Control Engineering | Designing the UAS autopilot, communication and control, and autonomy algorithms. |
| Data Science and IT | Designing and implementing the data architecture and product lifecycle management platform; Conducting data processing and data analytics. |
| Pilot/Operator | Operating the UAV for test flights and mission flights. |
| Project management | Overseeing and coordinating the project. |

A data model was developed to capture the metadata of the generic elements and their relationships as described in the above UAS architecture, see FIG. 13. The data model derived was based on the Smart Component data model. This abstract model has been implemented using sPLM system 30 to provide a collaborative platform, referred to as UsPLM 40, to facilitate data storage, access, exchange, and tracing all the data generated and flown throughout the project.

The core sPLM functions include: (1) Metadata and relationship management—involves modeling data schemas and entity relationships; (2) Version control and change management—modelling model variation and change tracing rules; (3) Item structure and configuration management—modelling data composition and configuration rules; (4) Navigation and visualization—visualization of data, models, and their relationships; (5) Roles and Security—modelling users, groups, and access permissions; (6) Workflow management—modelling lifecycle stages for items stored in the system and modelling process activities for each user role in the system; and (7) Analytics model execution—providing engines to interpret analytics models and apply them to new data. By unifying the data models for physical products and analytics models, these shared functions can be applied to all digital models of UAS devices, software, autonomy functions, and missions. The individual models can be versioned, tracked, and be composed with other compatible models, if needed. The rule and scoring engines embedded in UsPLM 40 allow building and executing configuration rules, regulation rules, and various machine-learning models. With this model-based architecture, UsPLM 40 implements a set of template modules for UAS users. These modules include the mission management for planners and operators; the UAV and payloads management for device developers; the Autonomy model management for algorithm developers; the datasets management for flight logs and simulation data analyses and visualization. UsPLM 40 also implements a set of connectors for surrounding tools, for example, mission planners, CAD tools, and data analytics tools.

The core classes of the UAS data model are described as follows:

PLM Generic Item 42: This item is the root class of the sPLM system; all other classes inherit from this class and the children of this class.

Physical Component 46: This item represents the physical components of a product to form its body. The classes for the overall air vehicle, the airframe and propellers, the avionics, the payloads, and the power systems are inherited from this class.

Analytical Component 48: This item represents the analytical components of a product to implement its intelligence. All the autonomy-related functions 56 (navigation, guidance, and control) can be implemented in different derivations of this class. Business rules 58, a specific case of analytics models, also inherits from this class.

Dataset 50: This item represents the datasets that have been extracted, aggregated, cleaned, and structured from various source of raw data. It can be a training dataset or a test dataset that provides the contexts to the analytics models built upon it.

UAS 52: This item represents an application-oriented UAS that is composed of certain physical components and analytical components, and is compatible with a range of missions.

Mission Plan 54: This item represents the operations of an individual UAV or a fleet of multiple UAVs to fulfill a mission requirement.

The UAS Concept Development

In the project preparation stage, a large number of articles in the fields of infrastructure management, environment monitoring, water sampling was reviewed and studied. The recent research topics on UAS were also explored from technical publications. For example, publications on the International Conference on Unmanned Aircraft Systems (ICUAS) during 2013-2016 timeframe indicates topics such as UAS applications, navigation, path planning, control architectures, and simulation are constantly the top research areas.

The sharing of this information, including the system requirements, literature analyses, and other publicly available information, together with the initial target product specification were coordinated by the project management team and could be accessed by both the engineering and data analytics teams for concept development. In the early concept exploration stage, the project team met frequently to exchange knowledge and ideas.

Each concept needed to consider a suitable configuration of the UAV hardware (air frame, avionics, payload, and power system), autonomy functions (state estimation, obstacle avoidance, etc.), and data communication methods. Several sample concepts are presented in Table 6.

TABLE 6

SEVERAL UAS CONCEPTS

| Concept | Concept Description | Characteristics |
| --- | --- | --- |
| Concept #1 | Quadcopter with autopilot<br>ADS-B for sense-and-avoid<br>Water-quality sensors<br>Cloud data storage | Low cost<br>Collaborative sense-and-avoid capability<br>No to low level autonomy |
| Concept #2 | Quadcopter with onboard computer<br>LIDAR for detect-and-avoid<br>Water-quality sensors<br>Onboard and cloud data storage | Affordable<br>Non-collaborative sense-and-avoid capability<br>Low level autonomy |
| Concept #3 | Octocopter with onboard computer<br>ADS-B and LIDAR for detect-and-avoid<br>High-precision water-quality sensors<br>Onboard and cloud data storage | Expensive<br>Collaborative and non-collaborative sense-and-avoid capabilities<br>Medium level autonomy<br>High payload capacity |

FIG. 14 shows a 3D model for the second concept. This concept includes a DJI F450 quadcopter air frame, an open source PixHawk autopilot controller, and a LIDAR sensor for scanning the surrounding environment. A portable computer, Raspberry PI, is used as the companion to the autopilot controller in order to deploy a custom-designed artificial potential field (APF) algorithm. This algorithm dynamically generates obstacle-free paths based on the real-time LIDAR data.

Guided by the integrated process model, several fundamental questions are consistently asked by the team for generating each concept:

Is the current knowledge sufficient enough to capture the real-world dynamics?

Is the problem in hand can be possibly solved by a data-driven modeling approach, and with what hypotheses?

What data should be collected and how often should the data be collected?

What sensors should be used?

How to decompose the decision-making process of an autonomy function? What are the repeatable/reusable analytics services?

Where to implement the analytics services, onboard or offboard?

Obstacle avoidance often follows the Sense-Detect-Avoid decision-making process: surveillance, state estimate and projection, conflict risk assessment, determination of appropriate avoidance maneuver, realization of the avoidance maneuver, and return to course, as illustrated in FIG. 15. One common approach for state measurement is to use an onboard inertial measurement unit (IMU) that processes observations from GPS and a set of sensors (gyroscope, accelerometer, magnetometer, barometer, etc.). These measurements are then fused by a set of algorithms to estimate/predict translational states (position and velocity) and rotational states (attitude and attitude rate). The translational states include north position ($P_n$), east position ($P_e$), altitude (h), north inertial velocity ($V_n$), east inertial velocity ($V_e$), and wind-relative airspeed ($V_{air}$). The rotational states include three Euler angles: yaw ($\psi$), pitch ($\theta$), and roll ($\phi$), as well as three angular rates $\omega_x$, $\omega_y$, and $\omega_z$.

As an example of a challenge the team faced, one question addressed was 'What if the UAS will be used in a GPS-denied environment where the GPS data is no longer viable'. In this situation, two alternative solutions could be available: (1) using other types of sensors to generate the GPS-equivalent data; (2) using completely different algorithms and sensors, for example, a vision-based system or a LIDAR-based system, to predict the desired state variables. In the first case, the software and all the data-processing functions are not necessarily changed, a sensor providing the same GPS format data solves the problem. In the second case, additional sensors, processors, software, data-processing functions have to be built into the design.

The criteria for concept ranking and selection should take the functionality, level of autonomy, cost, degree of modularity, and regulation requirement into consideration. A set of well-established Design for 'X' principles (e.g. design for manufacturing and assembly, design for sustainability) is used to evaluate and refine the product concepts. In addition, the product bill-of-materials for physical components is critical to determine the selections of raw materials, manufacturing tools and processes, as well as the disassembly and recycling methods. Similarly, data scientists employs a set of measurements, including data quality, prediction accuracy, computational costs, the capability to incrementally update with new data, to screen the analytics models. A bill-of-data and bill-of-services for data analytics models are also critical to determine which data analytics techniques should be employed in the downstream processes.

The selected concepts are further tested and refined through simulation-based optimization as well as based on feedbacks from field flights. The flight logs are important data sources to develop failure-diagnosis/prevention models, battery life predictive models, and learning models to tune the autopilot controller. The flight log data is centrally stored, extracted, and visualized in the sPLM platform (FIG. 16). The final UAS specification included the hardware specification, software specification, data specification, and analytics model specification.

The Team Interaction Pattern

The UAS development project lasted five months. The team interaction pattern is summarized and shown as in FIG. 17. It was consistent with the assumptions derived from our initial model. At the beginning, a large set of intermediate nodes were needed to identify the data sources and interests. The velocity of incoming data was fast, the data/information present had a high conflict, and uncertainty was also high. As the process progressed, more data and information was available, the design problem was more constrained, therefore the concepts were filtered and less ambiguous. When it came to integration and evaluation of the concepts, the viscosity increased again because there had to be a compromise for the multiple performance measures. It is noted the velocity decreased at first but then increased again once the simulation model started to generate data based on various trial settings, which is consistent with our process model.

Creating smart products requires developing two components—physical products (for physical bodies) and data products (for intelligence)—in a transdisciplinary approach across mechatronics, software, data science, and services domains. Mechanical and electrical engineers need to work closely with software engineers and data scientists to decide how to design the products to support more software-driven data-driven features. However, the misalignment of the product architecture and the development team organization may have a negative impact on product performance. This is due to the fact that product-related interdependencies may not be addressed by the team's interactions, or that the design teams may interact in spite of the absence of a product-related interdependency.

The present invention includes the $NPD^3$ model, an integrated process model for new product development with data-driven features by integrating the traditional NPD process model for physical product development with a formal data analytics process model, the CRISP-DM, for data product development. The integrated process model is encoded with BPMN (Business Process Model and Notation) so that it can be implemented for automation, in a business management system, e.g. a PLM system. An IDEF0-based notation is used to decompose the design information required for key tasks in the concept development stage. External and cross-disciplinary design information required by engineers and data scientists reveals direct interactions and critical messages exchanged between the two team groups with the project management group acting as a mediator to guide the collaboration between engineers and data scientists. The proposed process model was defined and implemented in an open-source PLM system and then tested and validated our process model via a case study relating to the use of an unmanned aircraft system.

Hence, this work helps to understand how engineers and data scientists should collaborate when they collectively need to develop future smart products that are highly data-driven. As in many other empirical studies, the generality of the findings could be enhanced by conducting additional case studies for other smart products in different industries. The present invention also realizes the descriptive nature of the interaction patterns between engineers and data scientists. As more case studies are conducted, these patterns and characteristics could be further analyzed for quantitative evaluation and comparison. While the present invention only focused on the concept development stage in this example, similar analyses could be conducted on other stages (e.g. Sub-System Design and Detail Design) of the product development process.

Example 3: Modular Design of Smart Products Autonomy

The levels of intelligence of a product system range from automation (doing exactly as programmed), limited autonomy (being capable of making decisions and planning its tasks), to full autonomy (being able to generate its own goals from inside motivations). Data analytics techniques and data-driven analytics models have become enablers to increase the degree of intelligence beyond what have been achieved by the traditional mechatronics with embedded software. Data analytics helps products knowing "what has happened" (descriptive analytics), "what could happen" (predictive analytics), and deciding "what to do" (prescriptive analytics).

On the other hand, the monitoring, control, and adaptation capabilities of smart products are raising the "servitization" trends of products. Servitization is recognized as the process of creating values by adding services to products. A product-service system (PSS) consists of products, services, networks of the actors, and supporting infrastructure that continuously satisfy customer needs. Data analytics enables the improvement of performance parameters (e.g., maintenance schedules) to increase asset efficiency, asset utilization, and to reduce total cost and the environmental impact.

The present invention addresses the modularity aspect of analytics models from a mixed product and decision-making service perspectives. The standardization of analytics model representation, the modular design approaches, the modularity quantification, and their impacts on the overall product design, will be discussed below.

As described previously, unmanned aircraft systems (UAS) are becoming more popular within a civilian context. By definition, it is a system whose components include the air vehicles and associated equipment that do not carry a human operator, but instead fly autonomously or are remotely piloted.

The autonomy of an UAS is defined as the UAS's own abilities of sensing, perceiving, analyzing, communicating, planning, decision-making, and acting/executing, to achieve its goals as assigned by its human operator(s) through a designed human-robot interface or by another system that the UAS communicates with.

FIG. 12 has depicted a UAS's generic architecture of its physical architecture, autonomy architecture, cyber-physical interfaces, and the supporting subsystems. A large number of low cost sensors (gyroscope, accelerometer, GPS, barometer, etc.) can be installed on the UAV as onboard payloads. The data generated by these sensors can be immediately used either by human operator or by automated algorithms to describe/predict the UAV's current and future states. The state estimates are then used to update/tune the control model to capture the UAV dynamics and the environment dynamics.

A UAS does not necessarily need all the payloads and all those autonomy enablers for a particular mission. It is important to design a modular UAS architecture so that the UAS can be easily reconfigured for various mission applications, minimizing the development time and cost while maximizing the mission performance. Compared to the modularity of the physical components of a UAS, the modularity of autonomy is harder to achieve because the autonomy implementation is tightly coupled with other components and the data generated from the system. This raises several challenging problems:

How to classify and decompose the autonomy-enabling functions?

What is the appropriate approaches to achieve modular design of these functions?

How to determine if an autonomy architecture is more modular?

Several configurations of the IMU have been used for a UAS. FIG. 19a shows a configuration based on an attitude and heading reference system (AHRS) architecture, and FIG. 19b shows a configuration based on a complete inertial navigation system (INS) architecture.

In the AHRS architecture, the attitude angles are estimated with the aid of an IMU, and translational states are acquired directly from GPS and pressure sensors. It uses stable low-bandwidth attitude observations to estimate biases in the high-bandwidth angular rate gyroscope, then integrate the de-biased gyroscope measurements to form a complete attitude estimate.

The INS architecture is a more computationally complex option for a UAS state estimation that combines the IMU and GPS measurements into a complete inertial navigation system. The low-pass-filtered translational state measurements from GPS are augmented with the higher-bandwidth acceleration on body rate measurements from the IMU. This is the main distinction between INS and AHRS. And an INS is typically implemented using an extended Kalman filter (EKF).

Both state estimation architectures can be represented as DMN (Decision Model and Notation) models that take the sensors data as inputs, and generate state estimates (the decisions). While they have the same inputs and outputs, the architectures are different, so which one is more modular? An analytics model can be standard or unique. Standard analytics models are defined as the models that have been standardized in open or industrial standards. Unique analytics models are defined as the ad-hoc models created for particular functions. A modularity function for evaluating analytics model architectures can be defined as an exponential function of the unique components (u) in the analytics model architecture. It consists of another three variables to reflect the inherent characteristics that contribute to modularity: the total number of components (N), the substitutability factor (s), and the degree of coupling ($\delta$). The interfaces of an analytics model are defined as the incoming linkages from input data plus the outgoing linkages to decisions. The degree of coupling is defined as the ratio of the total number of incoming links by the number of analytics model in a given subsystem. The substitutability is defined as the number of decisions an analytics model can make (the outgoing links) by the average number of interfaces of unique analytics model components. The modularity for each sub modules can be computed in the same way, they have been shown in FIG. 19.

The modularity of the INS architecture seems to be higher than that of the AHRS architecture due to the high modularity value of the INS module. However, the final design may not favor this architecture due to the physical constraints. For both architectures, the modularity will increase if more sub modules are implemented as standard analytics models.

A guidance system can be defined as the driver of a UAS that exercises planning and decision-making functions to achieve the assigned missions or goals. The role of a guidance system for UAS is to replace the cognitive processes of a human pilot and operator. The main functions of this system include: trajectory generation, path planning, mission planning, decision making, as well as reasoning and cognizance. Path planning is a process of using accumulated navigation data and a priori information to allow the UAS to find the best and safest way to reach a goal position or to accomplish a specific task. The decision process and information dependencies of a path planning architecture is shown in FIG. 20.

With an appropriate modular architecture design, the path planning module can be substituted with appropriate algorithms in different UAS applications. In an application as shown in FIG. 21, we use a fixed-wing plane carrying a high-resolution camera to survey a local lake. The path planning is done by a Grid algorithm to ensure the plane flying in the shortest path while covering the whole lake area. In the application as shown in FIG. 23, we use a quadcopter to explore the university campus with the campus map and building occupancy being given. The path planning is done by a sampling-based algorithm, Rapidly-exploring Random Tree Star (RRT*), to dynamically generate an obstacle-free path within the given map.

The UsPLM has been implemented to accommodate the modular UAS architecture that includes the physical architecture, autonomy architecture, and data/information architecture required by the UAS elements presented in FIG. 14. All the data, models, and configuration relationships involved in the UAS application development/deployment are recorded in the PLM database for monitoring and tracing. The bill of data and materials of a completed mission (for the campus exploration application) is shown in FIG. 22.

Autonomy and intelligence have been built into many of today's mechatronic products, taking advanced of low-cost sensor technologies and advanced machine learning algorithms. Design of product intelligence is no longer a trivial or additional option for the product development; instead, it calls for a systematic approach to understand the components and their characteristics that contribute to the intelligence. We argue that a smart product can be seen as an appropriate configuration of the physical components to form its body and the analytics models that implement its intelligence functions.

The advantage of modular design versus integral design of physical product architecture has been well understood. However, this has not been very clear for analytics models that possess both product characteristics and decision-making characteristics. On the product perspective, each analytics model can be seen as a result of production of chunks of data; data is the material to construct the analytics model in a certain kind of form. On the decision-making perspective, an analytics model takes data as inputs and generates decisions. A data object itself is also an analytics model that directly outputs the input as a decision to the next analytics models. Both perspectives suggest data must be a constituent of an analytics model.

Standardization of interfaces is a key step leading to modularization. Standardization efforts of predictive analytics have been seen in the business intelligence and data analytics community. The PMML is a well-adopted standard to facilitate a formal representation and exchange of predictive models among data analytics tools. The DMN is another standard employed in development of decision models embedded in business decision processes. These standards are employed to differentiate the standard analytics models from the ad-hoc analytics models, as well as to capture the requirement decomposition and the structure decomposition of analytics models.

Two product family design approaches, scale-based and module-based approaches, have been adapted to develop parametric and combinatorial analytics models. A modularity function has been derived to evaluate the degree of modularity of an analytics model architecture. These methods are then applied to guide our development of a modular UAS architecture that involves physical architecture, autonomy architecture, and data architecture. The modularity evaluation for the UAS state estimation module is discussed and the configurations of the overall modular UAS for different applications have been shown.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for managing a smart product, comprising:
a product application installed on a processor of the smart product and including a set of data describing a plurality of physical components of the smart product and a set of analytic models governing operation of the smart product, wherein at least one of analytical models in the set of analytic models is modified over time by the product application in response to use of the smart product to change how the smart product operates;
a product lifecycle management system running on computer hardware that is positioned remotely from and in communication with the product application, wherein the product lifecycle management system is programmed to include a rule engine for modeling operation of the smart product and a scoring engine for assessing the operation of the smart product based on modeling by the rule engine; and
a repository in communication with the product application and the product lifecycle management system for storing a copy of the set of data and the set of analytical models so that the copy of the set of analytical models includes any modifications to the at least one of the analytical models that have been made by the product application in response to use of the smart product.

2. The system of claim 1, wherein the smart product comprises an unmanned aerial vehicle.

3. The system of claim 2, wherein the set of data describing the plurality of physical components comprises a type of vehicle, a type of airframe, a type of avionics, a payload, and a power system.

4. The system of claim 3, wherein one of the plurality of analytical models comprises an autonomous navigation system having at least one navigation model that can be adjusted over time to change how the unmanned aerial vehicle controls its movement.

5. The system of claim 4, wherein the navigation model includes at least one of state estimation, perception, and situation awareness.

6. The system of claim 5, wherein the plurality of analytical models includes an autonomous guidance system having at least one guidance model that can be adjusted over time to change how the unmanned aerial vehicle selects a path of travel.

7. The system of claim 6, wherein the plurality of analytical models includes an autonomous control system having at least one control model that can be adjusted over time to change how the unmanned aerial vehicle controls its flight.

8. The system of claim 7, wherein the control model includes at least one of linear control, non-linear control, and learning-based control.

9. The system of claim 8, wherein the plurality of analytical models includes a mission plan for a specific task.

10. A method for managing a smart product, comprising the steps of:
installing a product application on the smart product and including a set of data describing a plurality of physical components of the smart product and a set of analytic models governing operation of the smart product, wherein at least one of analytical models in the set of analytic models is modified over time by the product application in response to use of the smart product to change how the smart product operates, a product lifecycle management system positioned remotely from and in communication with the product application, wherein the product lifecycle management system is programmed to include a rule engine for modeling operation of the smart product and a scoring engine for assessing the operation of the smart product based on modeling by the rule engine, and a repository in communication with the product application and the product lifecycle management system for storing the set of data and the set of analytical models so that the set of analytical models includes any modifications to the at least one of the analytical models made by the product application in response to use of the smart product; and
updating the product lifecycle management system and the repository with any changes to the set of analytic models governing the operation of the smart product.

11. The method of claim 10, wherein the smart product comprises an unmanned aerial vehicle.

12. The method of claim 11, wherein the set of data describing the plurality of physical components comprises a type of vehicle, a type of airframe, a type of avionics, a payload, and a power system.

13. The method of claim 12, wherein one of the plurality of analytical models is an autonomous navigation system having at least one navigation model that can be adjusted over time to change how the unmanned aerial vehicle controls its movement.

14. The method of claim 13, wherein the navigation model includes at least one of state estimation, perception, and situation awareness.

15. The method of claim 14, wherein the plurality of analytical models includes an autonomous guidance system having at least one guidance model that can be adjusted over time to change how the unmanned aerial vehicle selects a path of travel.

16. The method of claim 15, wherein the plurality of analytical models includes an autonomous control system having at least one control model that can be adjusted over time to change how the unmanned aerial vehicle controls its flight.

17. The method of claim 16, wherein the control model includes at least one of linear control, non-linear control, and learning-based control.

18. The method of claim 17, wherein the plurality of analytical models includes a mission plan for a specific task.

* * * * *